US006954199B2

(12) United States Patent
Soto et al.

(10) Patent No.: US 6,954,199 B2
(45) Date of Patent: Oct. 11, 2005

(54) THREE DIMENSIONAL INTERACTIVE SYSTEM

(75) Inventors: Jorge Soto, Concord, CA (US); Richard Freeman, San Carlos, CA (US); Eric Shuler, Piedmont, CA (US); Mark Flowers, Los Gatos, CA (US)

(73) Assignee: LeapFrog Enterprises, Inc., Emeryville, CA (US)

( * ) Notice: Subject to any disclaimer, the term of this patent is extended or adjusted under 35 U.S.C. 154(b) by 386 days.

(21) Appl. No.: 10/174,523

(22) Filed: Jun. 17, 2002

(65) Prior Publication Data

US 2003/0016210 A1 Jan. 23, 2003

Related U.S. Application Data

(60) Provisional application No. 60/299,394, filed on Jun. 18, 2001.

(51) Int. Cl.[7] .................................................. G09G 5/00
(52) U.S. Cl. ....................... 345/173; 345/169; 345/174; 345/179; 345/206; 345/1.1; 345/2.3; 345/5; 434/169; 434/178; 434/308; 434/309; 434/317; 434/318
(58) Field of Search ................................. 345/169, 173, 345/174, 179, 206, 1.1, 2.3, 5; 434/169, 178, 308, 309, 317, 318

(56) References Cited

U.S. PATENT DOCUMENTS 5,096,204 A * 3/1992 Lippman .................... 273/285

| | | | |
|---|---|---|---|
| 5,485,176 A | | 1/1996 | Ohara et al. |
| 5,557,287 A | * | 9/1996 | Pottala et al. ................ 343/702 |
| 5,575,659 A | | 11/1996 | King et al. |
| 5,688,705 A | | 11/1997 | Conroy et al. |
| 5,853,327 A | | 12/1998 | Gilboa |
| 5,855,483 A | | 1/1999 | Collins et al. |
| 5,873,070 A | * | 2/1999 | Bunte et al. ................... 705/28 |
| 5,877,458 A | | 3/1999 | Flowers |
| 5,967,898 A | | 10/1999 | Takasaka et al. |

FOREIGN PATENT DOCUMENTS

WO    WO 01/84529 A1    11/2001

* cited by examiner

Primary Examiner—Bipin Shalwala
Assistant Examiner—Vincent E. Kovalick
(74) Attorney, Agent, or Firm—Townsend and Townsend and Crew LLP

(57) ABSTRACT

A three-dimensional position locating system is disclosed. In one embodiment, the three-dimensional position locating system includes a housing including a substantially planar surface. The housing includes a first antenna element under the substantially planar surface. A stylus including a second antenna element is coupled to the housing. A processor is electrically coupled to the first antenna element and the second antenna element, and a three-dimensional structure overlies the first antenna element. An antenna coupling element is associated with the three-dimensional structure and an output device can be coupled to the processor.

43 Claims, 14 Drawing Sheets

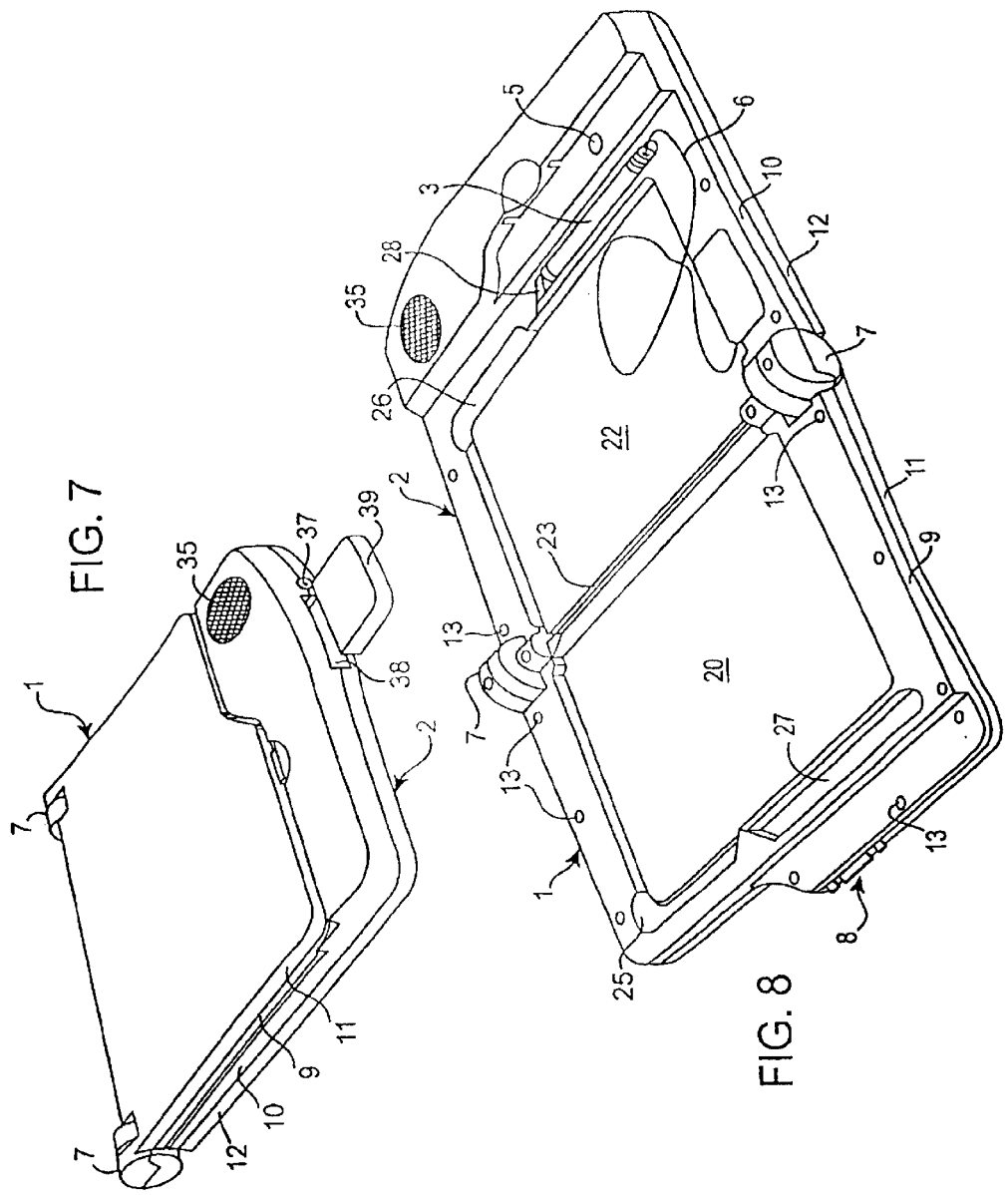

THREE DIMENSIONAL INTERACTIVE SYSTEM

CROSS-REFERENCES TO RELATED APPLICATIONS

This application claims the benefit of the filing date of U.S. Provisional Patent Application No. 60/299,394 filed Jun. 18, 2001. This U.S. Provisional Patent Application is herein incorporated by reference in its entirety for all purposes.

BACKGROUND OF THE INVENTION

When learning about a particular subject, it is helpful for a student to have the assistance of an adult. For example, a young child will often learn to read by looking at a book containing pictures and corresponding words while an adult reads the words. The child follows the words and looks at the associated pictures as the adult reads. The child can study a word within a particular grammatical structure and can gather its meaning, either from the pictures and/or through additional explanation provided by the adult. At any point, the adult can discuss any word or its meaning with the child, or draw the child's attention to a similar word. The adult could also provide a further explanation if needed.

In addition to personalized instruction, instructional aids can assist the child in the learning process. For example, U.S. Pat. No. 5,485,176 describes a system for interacting with a book. The book rests on a housing. A user uses a stylus to select a word or picture in the book. In response, the system can produce an output corresponding to the selected word or picture. For example, after the user selects a picture of an elephant in the book, the system can say the word "elephant," and can produce a sound associated with an elephant.

While systems of the type described in U.S. Pat. No. 5,485,176 are effective, improvements could be made. For example, the books that are used in the systems are two-dimensional. Two-dimensional books have limited ability to convey concepts to a user. For example, a user may not fully appreciate what an elephant looks like in real life by viewing only a two-dimensional picture of the elephant. For example, the user cannot fully appreciate the size proportions of the different body parts of an elephant by viewing only a two-dimensional picture of an elephant.

It would be desirable if the presentation of words or pictures to the user was not limited to two-dimensions. It would also be desirable to provide for a three-dimensional interactive system where a user could select points in three-dimensions and receive some feedback. This would make learning more enjoyable and effective.

Embodiments of the invention address the above problems and other problems, individually and collectively.

SUMMARY OF THE INVENTION

Embodiments of the invention are directed to three-dimensional position locating systems and components used in the systems.

One embodiment of the invention is directed to a three-dimensional position locating system comprising: (a) an essentially two-dimensional antenna element underlying an essentially planar surface; (b) an antenna element located in a stylus, coupled to the underlying antenna element through a signal driver and signal processor; (c) a three-dimensional structure overlying the underlying antenna element; (d) at least one antenna coupling element having a first end proximal to the underlying antenna element and having a second end near a surface of the three-dimensional structure; and (e) an audio generating circuit coupled to the signal processor and responsive to the position located using the stylus.

Another embodiment is directed to a three-dimensional position locating system comprising: (a) a housing including a substantially planar surface, wherein the housing houses a first antenna element, the first antenna element being under the substantially planar surface; (b) a stylus comprising a second antenna element; (c) a processor electrically coupled to the first antenna element and the second antenna element; (d) a three-dimensional structure overlying the substantially planar surface and the first antenna element; (e) an antenna coupling element associated with the three-dimensional structure; and (f) an output device coupled to the processor.

Another embodiment is directed to a three-dimensional position locating system comprising: (a) a housing including a substantially planar surface, wherein the housing houses a first antenna element, which is under the substantially planar surface; (b) a stylus comprising a second antenna element; (c) a processor electrically coupled to the first antenna element and the second antenna element; (d) a three-dimensional structure overlying the first antenna element and the substantially planar surface; and (e) an output device coupled to the processor.

Another embodiment is directed to a three-dimensional position locating system comprising: (a) a housing including a surface, wherein the housing houses a first antenna element, which is under the surface; (b) a stylus comprising a second antenna element; (c) a processor electrically coupled to the first antenna element and the second antenna element; (d) a structure having at least a portion that is generally vertical oriented with respect to the substantially planar surface and overlying the first antenna element and the surface; (e) an antenna coupling element associated with the structure; and (f) an output device coupled to the processor.

Another embodiment is directed to a three-dimensional toy for use with a platform unit having a housing that houses a first antenna element and a stylus that includes a second antenna element, the three-dimensional toy comprising: (a) a three-dimensional structure; and (b) an antenna coupling element associated with the three-dimensional structure, wherein the antenna coupling element is adapted to electromagnetically couple the first and second antenna elements when the three-dimensional toy is used with the platform unit.

These and other embodiments are described in further detail below with reference to the Figures and the Detailed Description.

BRIEF DESCRIPTION OF THE DRAWINGS

FIG. 7 shows a perspective view of a platform unit in a closed position.

FIG. 8 is a perspective view of the platform unit in an open position.

DETAILED DESCRIPTION OF THE INVENTION

Figure 1:
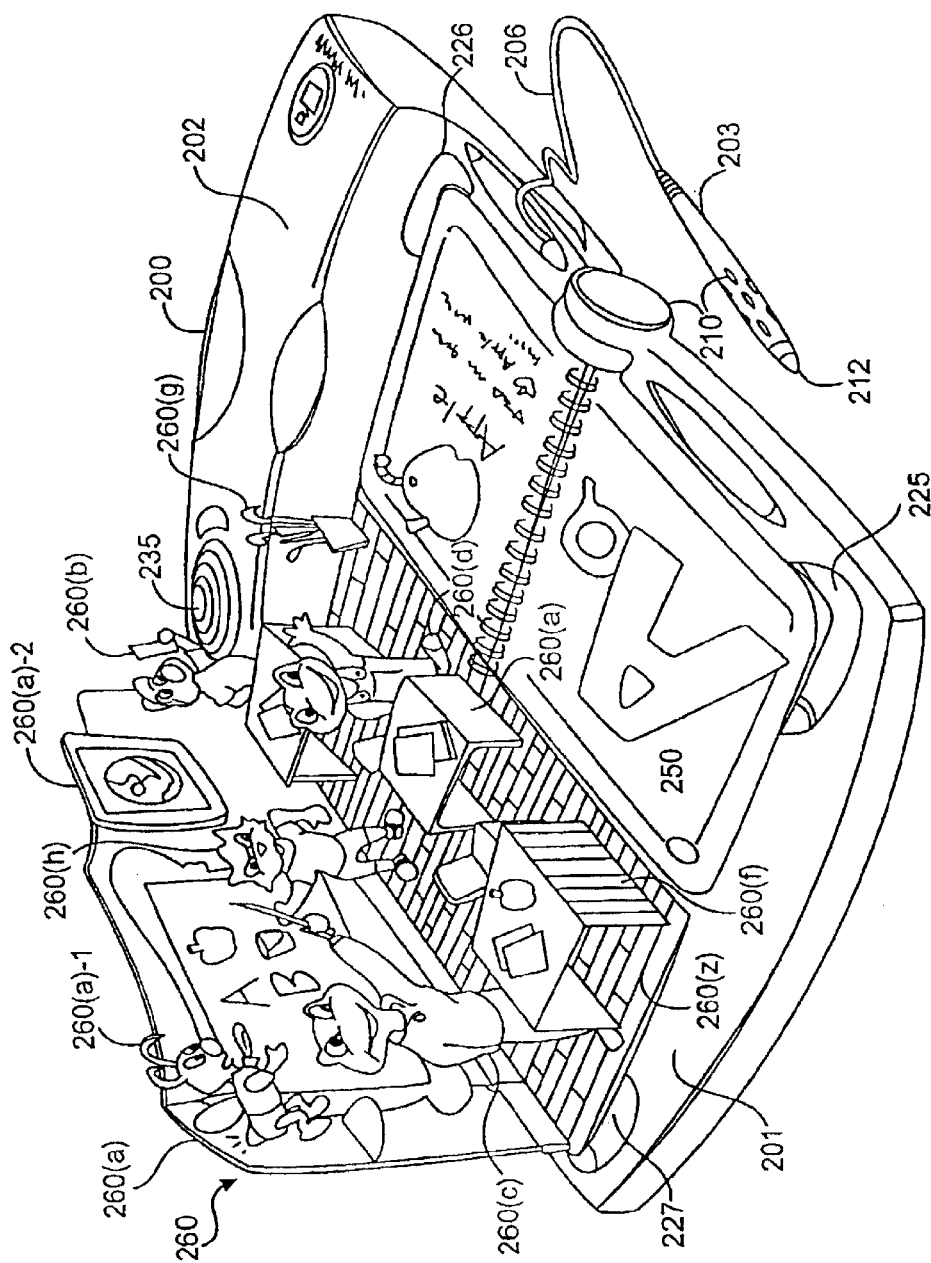
FIG. 1 illustrates a perspective view of a three-dimensional position locating system including a platform unit including a housing, a stylus, a book on the housing, and a three-dimensional structure in a pop-up book form on the housing.

One embodiment of the invention is directed to a three-dimensional position locating system including a housing having a substantially planar surface. The housing houses a substantially two-dimensional first antenna element under the substantially planar surface. A three-dimensional structure such as an open pop-up book forming a pop-up structure or a sculpture lies over the first antenna element and the surface.

An antenna coupling element is associated with the three-dimensional structure. One portion of the antenna coupling element is proximate to the first antenna element and the surface while another portion of the antenna coupling element is distal to the first antenna element and the surface. The antenna coupling element may be a conductive trace, wire, etc. inside of or on the three-dimensional structure. For example, the antenna coupling element may be a conductive trace inside of a sculpture with a first end portion proximate to the first antenna element and a second end portion distal to the first antenna element.

A stylus comprising a second antenna element can be physically coupled to the housing, for example, through a cable. A processor is electrically coupled to the first antenna element and the second antenna element. An output device is also coupled to the processor. The output device may be, for example, a speaker. In some embodiments, the processor and the output device may be within the housing.

In embodiments of the invention, a user can electronically interact with a three-dimensional structure, even through the first antenna element is substantially two-dimensional. A user can use the stylus to select a region of the three-dimensional structure. The selectable region can correspond to the distal portion of an antenna coupling element in the three-dimensional structure. The first antenna element transmits a unique signal corresponding to a specific x-y location through the antenna coupling element and the stylus receives this signal. The antenna coupling element electromagnetically couples the second antenna element and the first antenna element in this process. Using the unique signal data, the processor can then determine which region was selected by the user and an output corresponding to the selected region can be presented to the user.

The first antenna element and the second antenna element can form part of an antenna type position locating system. There are several types of antenna position locating systems that can identify the location of a stylus over a two-dimensional surface. Some examples are in U.S. Pat. Nos. 4,136,336, 5,485,176, 5,877,458 and 5,686,705. Other examples are in U.S. patent application Ser. Nos. 09/574,499, 09/777,262, and 09/796,685. All of these patents and patent applications are herein incorporated by reference in their entirety for all purposes.

Two-dimensional position locating antenna systems typically comprise a transmitting antenna element, a receiving antenna element, and a data processing element. In one type, an underlying antenna element in a housing can transmit a signal and an antenna in a stylus can receive the signal. In another type, an antenna in the stylus can transmit a signal and the underlying antenna in a housing can receive the signal. In embodiments of the invention, the first or the second antenna element may constitute a transmitting element. For ease of illustration, many examples described herein use a first transmitting antenna element. However, embodiments of the invention are not limited to such examples.

In embodiments of the invention, the first antenna element in the housing may comprise a continuous conducting sheet, a set of multiple antenna parts, or a set of conductive fingers. If the antenna element comprises fingers, it can transmit a pattern of sequential signals from individual antenna fingers or combinations of antenna fingers. It can also transmit signals from all the fingers at once. Thus, the first antenna element may transmit signals in any suitable manner or pattern. Conversely, if the underlying first antenna element comprises a receiving antenna with a plurality of conductive fingers, it can receive a signal or a series of signals from the stylus in any pattern using one or more fingers.

Such position locating systems can be used to electronically interpret information in a substantially planar configuration (e.g., as in a two-dimensional book). Illustratively, a two-dimensional first antenna element may be under a substantially planar surface of a housing. A print medium such as a document may be placed on the surface. The planar surface can be thought of as having an X and a Y axis, and thus conveniently is referred to as a "2D surface." When the underlying first antenna element transmits a signal, a receiving antenna associated with the stylus can be used to sense the signal strength, or other parameter of the signal. The value of the parameter sensed can be used to calculate the position of the stylus along the X and the Y axis. If the document is placed over the underlying antenna element, and locations of certain graphics on the document are known in terms of their X and Y position, the stylus position can be correlated to the location of a graphic element. That way, it is possible to determine which graphic element that the user selected.

Embodiments of the invention enable a user to select regions in three-dimensions to obtain some audio or visual output. The output can relate to information that may be present at the selected points. Antenna coupling elements are attached to the selectable regions. These selectable regions may be called "hot spots." The distal end of an antenna coupling element may correspond to a hotspot and the proximate end may be adjacent to the underlying first antenna element. The antenna coupling elements may be made from any suitable conductive material, including, but not limited to, wires, conducting polymers, conductive inks, metallic strips and other electrically conducting materials.

The antenna coupling elements can each have first and second ends, and an intermediate portion. The first and second ends of the antenna coupling elements can be spatially separated from the first and second antenna elements, respectively. When a user selects a region of the three-dimensional structure with the stylus, the first and second antenna elements can electromagnetically couple to each other through the antenna coupling element, even though the first and second antenna elements are not directly physically connected to the antenna coupling element. During this temporary electromagnetic coupling, the second antenna element receives a unique signal from the first antenna element. Using the signal, an audio output corresponding to the selected region is produced. The user can thus electronically interact with the three-dimensional structure on the surface of the platform unit.

Illustratively, the images of a plate and a glass could be on a pop-up table in a pop-up book that is present on a planar surface of a platform unit. A first transmitting antenna element is under the surface. One conductive trace could extend from the near the point where the leg is fastened to the book page to the underside of the table where the image of a plate is located. A second conductive trace could extend from near the point where a second table leg is fastened to the book page to the underside of the table where the image of a glass is located. Each trace would act as an antenna coupling element that would associate its terminal end on the table top to the spot where the table leg was fastened to the page. Different signals generated by the first antenna element, at the locations where the first or second table legs are fastened to the page are transmitted to the other ends of the traces and through the images on the tabletop. A user can use a stylus to select, for example, the image of the glass. Once this is done, a second antenna element receives the signal coming from the antenna coupling element associated with the glass. Then, a processor may interpret the received signal and may cause the system to generate some audio output that corresponds to the glass (e.g., "this is a glass"). In this way, an essentially planar, or two-dimensional, position locating system is converted to a three-dimensional position locating system.

Three-dimensional structures may convey concepts to a user better than a two-dimensional book alone. Moreover, three-dimensional structures can entice the user by providing an object that is amusing or interesting to look at and/or interact with. The three-dimensional structure may be used by itself in the system, with a two-dimensional book, and/or with other three-dimensional structures. Also, the platform unit that is used in embodiments of the invention may also be used with two-dimensional books alone, without a three-dimensional structure. Thus, embodiments of the invention can be easily adapted to the needs or desires of the user.

Any suitable three-dimensional structure may be used in embodiments of the invention. As noted above, exemplary three-dimensional structures include paper pop-up structures, sculptures (e.g., figurines), etc. The three-dimensional structures can also be stand-alone toys that can operate independently or dependently of the platform unit.

One example of a three-dimensional structure is a "pop-up" structure in a pop-up book. A pop-up structure forms on two opened pages of a pop-up book. Pop-up structures can be formed by attaching pieces of folded paper on adjacent pages of a book (or card). When the adjacent pages are open, the folded pieces of paper can unfold and stand off of the open pages. That is, the folded pieces of paper "pop-up" when the adjacent pages are opened. Edges of the folded pieces of paper may be fastened to the adjacent pages so that the unfolded shape does not separate from the paper sheet or document. Pop-up structures can fold back down by closing the adjacent pages. They can lie flat when the book is closed. Although paper is often used in pop-up books, other materials besides paper (e.g. cardboard, rigid plastic) can be used as long as the material can produce a desired shape.

If pop-up structures are used, for example, in a book to teach about language, the book may have three-dimensional structures of various household settings. For example, open pages of the book may form pop-up structures such as a table, chairs, and other structures that are found in a kitchen. The table might be configured with four table legs having their bottom ends attached to the page and the other ends attached to flat shape that represents a table top when the four legs are folded out from the page. The tabletop may have, for example, images of a plate, a glass, a cup, a napkin and some tableware on its surface.

Educational and entertaining audio outputs can be produced when a user selects each of the images with a stylus. The audio signals produced may correspond to the images being selected by the user. For example, the audio signals may comprise the names of the selected images. In the above example, selecting the plate, glass, or cup could cause the system to say the words "plate", "glass", and "cup", respectively. At another place on the pages, the words for the images might be spelled out. For example, the words "plate", "glass", and "cup" could be printed on the pages of the book. These printed words could also be selectable by the user. Also, the names of the letters, the phonics associated with the letters, and full word could be pronounced depending on the mode that the platform unit is currently in. For example, the platform unit may have "say it" or "spell it" modes whereby the platform unit respectively says or spells a word after the user has selected it. Other pages of the book might open to create living room, bedroom, garden, or automobile pop-up structures. It is apparent from this example that embodiments of the invention can be used to assist the user in learning a language such as a native or foreign language.

Another embodiment of the invention includes a three-dimensional structure that is in the form of a "sculpture." The sculpture may be a figurine. It may be hard, soft, or plush. The sculpture may be formed in any suitable manner including molding or shaping. In some embodiments, a print medium such as a document could be completely eliminated and sculptures may be the only structures on the surface of the platform unit. For example, a figurine containing at least one antenna coupling element can be placed directly over an underlying antenna element of the substantially planar surface of a platform unit. The figurine could be used without a two-dimensional book.

The three-dimensional structures can also be stand-alone toys that can operate independently of the platform unit. They could have one or more antenna coupling elements in them, and they may also have input devices (e.g., mechanical switches), output devices, electronics, and a power source (e.g., batteries) that are independent of any such components in the underlying platform unit. A child, for example, could play with the three-dimensional toy independently of the platform unit. Alternatively, the toy could have mechanical switches and one or more antenna coupling elements associated with it, but may not have its own processor or speaker. A cable could couple the internal electronics in the toy to the processor and speaker in the platform unit so that the toy can use them. The activation of a mechanical switch in the toy, for example, could cause the speaker in the platform unit to produce a sound.

Illustratively, a three-dimensional structure could be in the form of a toy submarine with a number of plastic figurines that can toggle or depressible buttons. They can act as input switches for the toy. The toy submarine may have its own batteries, and electronics. The toy submarine may be used on the platform unit, or the user may play with the toy submarine independently of the platform unit. If it is used on the platform unit, an associated two-dimensional book may be used in conjunction with the toy submarine. The two-dimensional book may teach the user about, for example, ocean animals. The user can interact with the toy submarine by selecting regions of it with a stylus, or could press buttons or toggle figurines on it to produce various outputs. The toy submarine may have its own speaker and processor or may use the speaker or processor in the platform unit to produce sound. As in other embodiments described above and below, antenna coupling elements embedded within the toy submarine can be used to electromagnetically couple a two-dimensional first antenna element in the platform unit with a second antenna element in the stylus. In addition, the user may interact with the two-dimensional book using the stylus.

The three-dimensional structures and/or books in embodiments of the invention may correspond to the same theme. Either or both of the three-dimensional structure and the book may be adapted to teach the user about any suitable subject. Exemplary subjects include math, science, language, spelling, letter recognition, fun facts, history, geology, astronomy, foreign languages, etc. The books may each include a spine such as a spiral spine or a ring binder. Although some embodiments are educational in nature, other embodiments of the invention need not be. For example, embodiments of the invention can be purely entertaining or amusing to the user.

Embodiments of the invention also include kits that include the three-dimensional structures with antenna coupling elements. The kits may include one or more three-dimensional structures alone, or in conjunction with a two-dimensional book or other document that can be used with the platform unit. For example, a kit may include the above-described three-dimensional toy with coupling elements, alone or in conjunction with a two-dimensional book that relates to the three-dimensional toy. The three-dimensional structures and the books can be adapted for use with a platform unit. A data cartridge or other transferable information storage medium for the three-dimensional structure and/or the book may be optionally in the kit.

If the audio outputs vary from document to document, or from structure to structure, cartridges containing data correlating the locations of the images on a particular document or on a particular structure, and corresponding audio outputs can be used. A cartridge for a specific document and/or three-dimensional structure may be inserted into the housing so that a processor can access the data. Instead of a data cartridge, other transferable information storage media such as compact disks, memory sticks, tapes, etc. could be used to provide the platform unit with the appropriate operating code or content.

In other applications, a liquid crystal display (LCD) or other display device could be used in addition to, or as an alternative to, an audio output device such as a speaker. This might be useful to teach about money. For example, a three-dimensional structure may be in the form of numbers, coins, and/or sculptures of items to be purchased. A stylus is used to select, for example, an item to be purchased (e.g. a sculpture of a loaf of bread). The putative price can be displayed on the display device and audio can be generated to state the value of the displayed number.

FIG. 1 shows an interactive system according to an embodiment of the invention. FIG. 1 shows a platform unit 200 including a housing that contains a first antenna element (not shown) underneath a surface of the platform unit 200. Borders or other retaining structures may define the surface and may form a recessed region in the platform unit 200. The housing is formed from a first housing portion 201 and a second housing portion 202 that are coupled together through a hinge 210.

A two-dimensional book 250 and a three-dimensional structure 260 are respectively on a first portion and a second portion of the surface of the platform unit 200. The borders or retaining structures defining the surface restrain the movement of the two-dimensional book 250 and the three-dimensional structure 260 on the platform unit 200, which may be temporarily or permanently on the platform unit 200. If the two-dimensional book 250 and the three-dimensional structure 260 are removable, grooves 225, 226, 227 are present at the edges of the surface so that a user can insert the user's fingers into them and remove them from the platform unit 200. When the two-dimensional book 250 and the three-dimensional structure 260 are separated from the platform unit 200, the first and second housing portions 201, 202 may fold upon themselves to close the platform unit 200. In other embodiments, the hinge 210 is not needed. In these embodiments, the housing can be in the form of a single, unitary structure that does not fold upon itself.

A stylus 203 including a distal end 212 and a conductive grip region 210 may be coupled to the second housing portion 202 through a cable 206. The conductive grip region 210 may be coupled to a shield structure (not shown) in the stylus 203 to ground the user. The stylus 203 could alternatively be coupled to the electronics within the housing of the platform unit 200 through a wireless connection instead of a cable.

The stylus 203 can be used to select particular images (e.g., letters, words, pictures) in the two-dimensional book 250. The stylus 203 can also be used to select images, objects, or substructures in the three-dimensional structure 260. Audio feedback can be provided to the user through a speaker 235 in the platform unit 200 after the user selects an image, object, or substructure in either the two-dimensional book 250 or the three-dimensional structure 260.

The three-dimensional structure 260 includes a plurality of substructures 260(a)–(h) on a planar base member 260(z). In this example, the three-dimensional substructures 260(a)–260(h) are each generally vertically-oriented with respect to the base member 260(z). The substructures 260(a)–260(h) may themselves be three-dimensional in nature (e.g., sculptures or pop-up structures), or they may have two-dimensional components. For example, the substructures 260(a)–260(h) could be three-dimensional figurines, two dimensional plastic cards with images on them, or paper pop-up structures with images printed on them. As shown in FIG. 1, a substructure 260(a) may include two or more separate objects 280(a)-1, 280(b)-1 that a user may interact with. These objects 280(a)-1, 280(b)-1 may be, for example, different images, sculptures, etc. that the user may select to receive a specified output.

The content in the two-dimensional book 250 and the three-dimensional structure 260 may relate to a common theme or common subject matter. For example, the content in the two-dimensional book 250 and in the three-dimensional structure 260 may relate to animals or transportation vehicles. Alternatively, the three-dimensional structure 260 can entertain or attract the user to the system so that the user interacts with the two-dimensional book 250. For example, the three-dimensional structure 260 could have animated characters that may be amusing or entertaining to the user, and the content in the book 250 may relate to a particular subject such as the spelling, word recognition, math, history, science, fun facts, etc.

In FIG. 1, the three-dimensional structure 260 shows a number of animated characters in a classroom setting. The two-dimensional book 250 includes educational content such as the letter "A" and a picture of an object that starts with the letter A. A child could manipulate the stylus 203 to select the letter "A" in the book 250. In response, the audio output provided by the platform unit 200 may relate to the letter A. For example, after selecting the letter A with the stylus 203, the platform unit 200 may say, "A, A says Ahh." The user could also manipulate the stylus 203 to select, for example, a first object 260(a)-1 in the form of a firefly in the three-dimensional structure 260. In response, the platform unit 200 could say something related or unrelated to the content in the book 250. For example, the platform unit 200 could produce an audio output such as "Hi, I'm Edison!" after the object 260(a)-1 is selected with the stylus 203. Alternatively, the platform unit could produce an audio output such as "Hi, I'm Edison, the word apple starts with the letter A" after the object 260(a)-1 is selected with the stylus 203.

Figure 2:
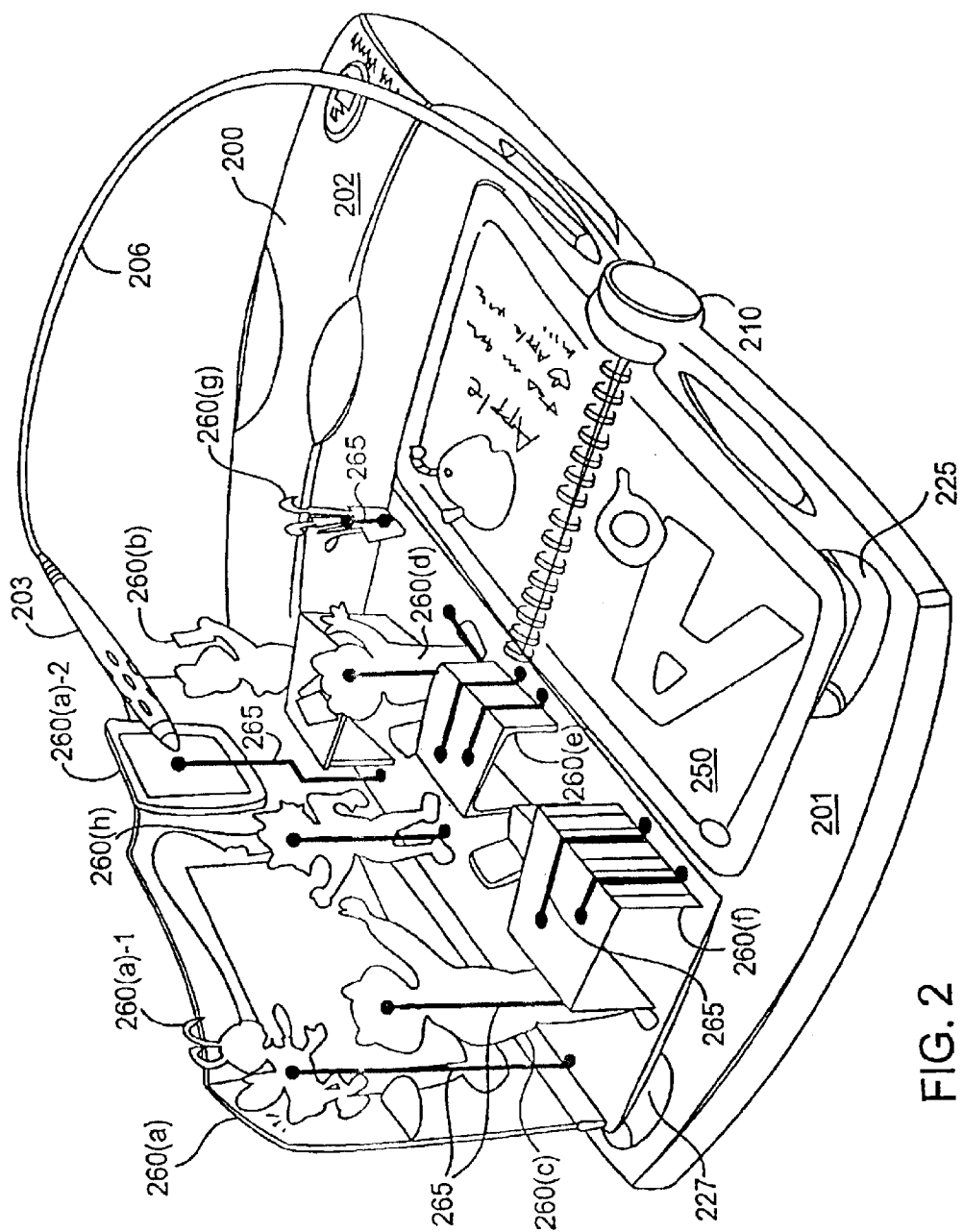
FIG. 2 illustrates an outline of a portion of the three-dimensional position locating system in FIG. 1 with antenna coupling elements shown.

FIG. 2 shows a number of antenna coupling elements 265 associated with the plurality of substructures 260(a)–260(h) shown in FIG. 1. Each antenna coupling element 265 has a first end proximate the platform unit 200, a second end distal to the platform unit 200, and an intermediate portion between the first and second ends. In this example, the ends are wider than the intermediate portion between them. By providing a wider distal end portion, stronger signals can be transmitted to the stylus 203 by the wider transmitting area. Also, by providing a wider proximate end portion, signals from the first antenna element (not shown) in the platform unit 200 are more likely to be received by the wider receiving area. Providing narrower intermediate portions in the antenna coupling structures increases the spacing between adjacent antenna coupling structures and reduces the likelihood of unintended electromagnetic coupling between them (e.g., between the two antenna coupling elements associated with structure 260(f)). Alternatively, the ends and the intermediate portion may have substantially the same width.

Figure 3:
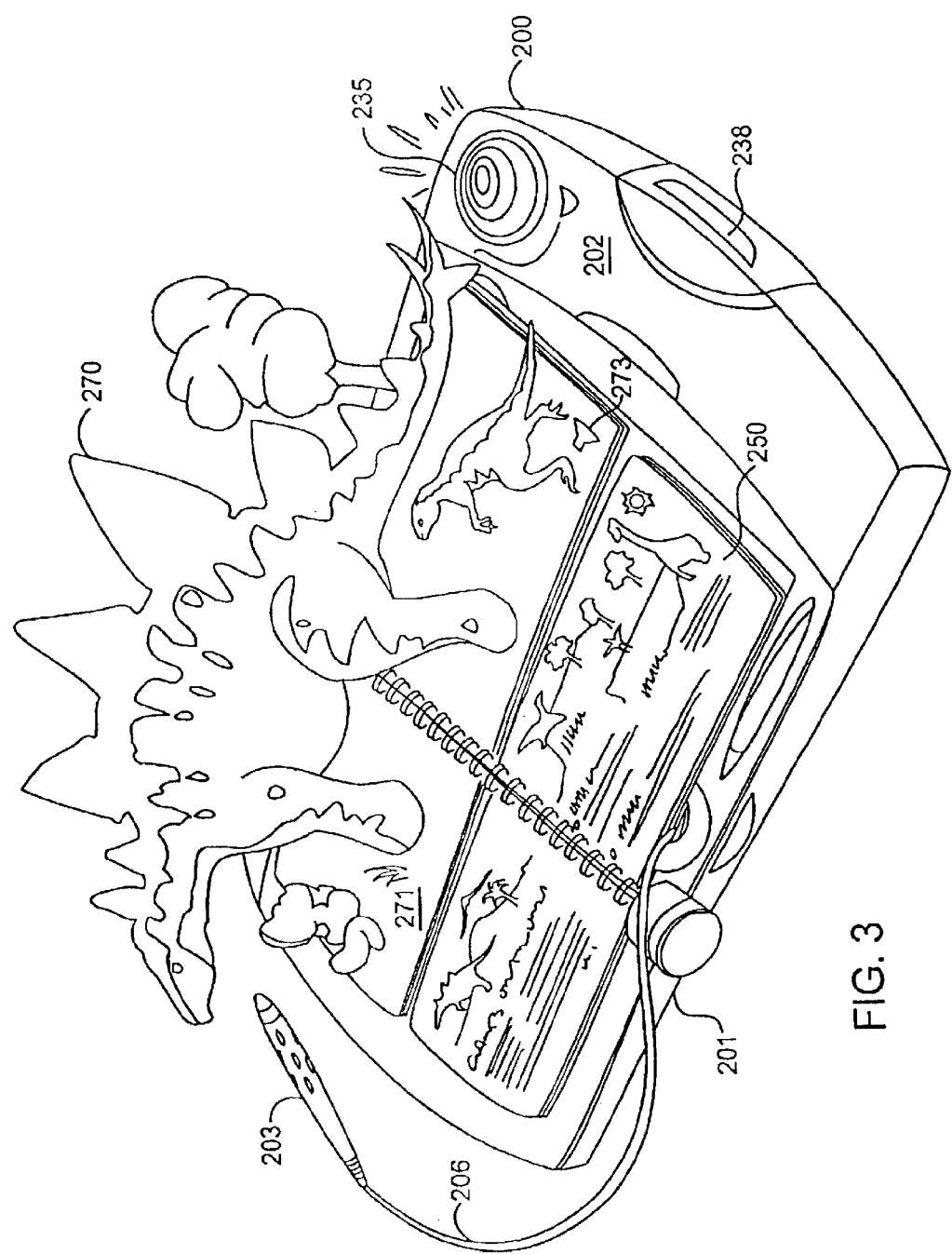
FIG. 3 illustrates a perspective view of a three-dimensional position locating system including a platform unit including a housing, a stylus, a book on the housing, and a three-dimensional structure in the form of a sculpture on the housing.
Figure 4:
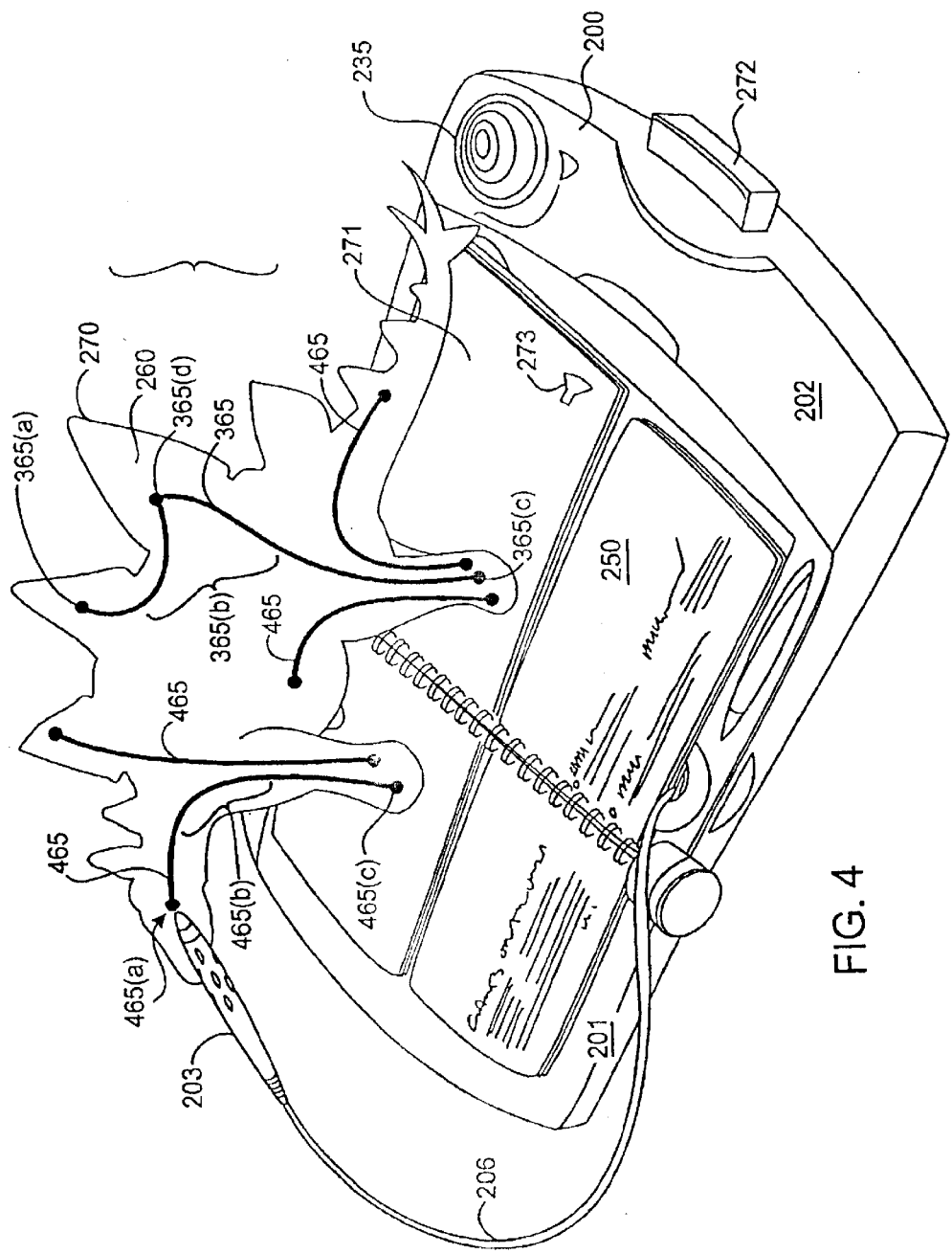
FIG. 4 illustrates the three-dimensional position locating system in FIG. 3 with the antenna coupling elements shown.

In other embodiments, sculptures may be used in embodiments of the invention, with or without a corresponding print medium. An example of a sculpture embodiment is shown in FIGS. 3 and 4. FIG. 3 shows a three-dimensional structure 260 in the form of a dinosaur. The dinosaur may be molded, soft, or hard. The dinosaur stands on a horizontal base that occupies a first portion of a surface of the housing of the platform unit 200. A book 250 about dinosaurs may be on the platform unit 200. In this embodiment, a slot 238 is on the side of the platform unit 200. This slot 238 may receive a transferable information storage medium that may contain computer code for appropriate for the book 250 and the three-dimensional structure 260. The image of a speaker 273 is on the side of the dinosaur and when a user touches the stylus to that image, the name of the dinosaur is produced.

As shown in FIG. 4, any suitable number of antenna coupling elements can be present in the dinosaur 260. In FIG. 4, there are five antenna coupling elements 365, 465. Each one includes a first end 365(c), 465(c) proximate to the first antenna element (not shown) in the housing of the platform unit 200 and a second end 365(a), 465(a) distal to it. A narrower intermediate portion 365(b), 465(b) is between each first and second end. In FIG. 4, one antenna coupling element 365 includes an intermediate portion 365(b) with a widened portion 365(d). This widened portion 365(d) can correspond to an additional "hot spot" that the user may select. The widened portion 265(d) in the intermediate portion 265(b) can be used to transmit a stronger signal to the stylus 203. Markings may be present on the exterior of the dinosaur over the widened portions 365(a), 365(d) to show the user that these regions may be selected. Using the stylus 203, the user may select either hot spot (corresponding to regions 365(a) or 365(b)) and may receive the same audio sequence from the speaker 235. For example, the phrase "this is the dinosaur's back plate" may sound after the user places the stylus 203 close to either of the widened portions 365(a), 365(d).

The antenna coupling elements in the dinosaur may be at any suitable location. For example, a first antenna coupling element could run from the bottom of one leg to the side of the dinosaur. When the side is selected, the name of the dinosaur may be recited. A second antenna coupling element might run between the bottom of a second leg and the head of the dinosaur. When the head of the dinosaur is selected with a stylus, information about the brain size and general intelligence of that type of dinosaur might be stated. A third coupling element might connect the bottom of a third leg to the dinosaur's mouth. When the mouth is selected with a stylus, information about the food consumed by this type of dinosaur would be stated.

Figure 5:
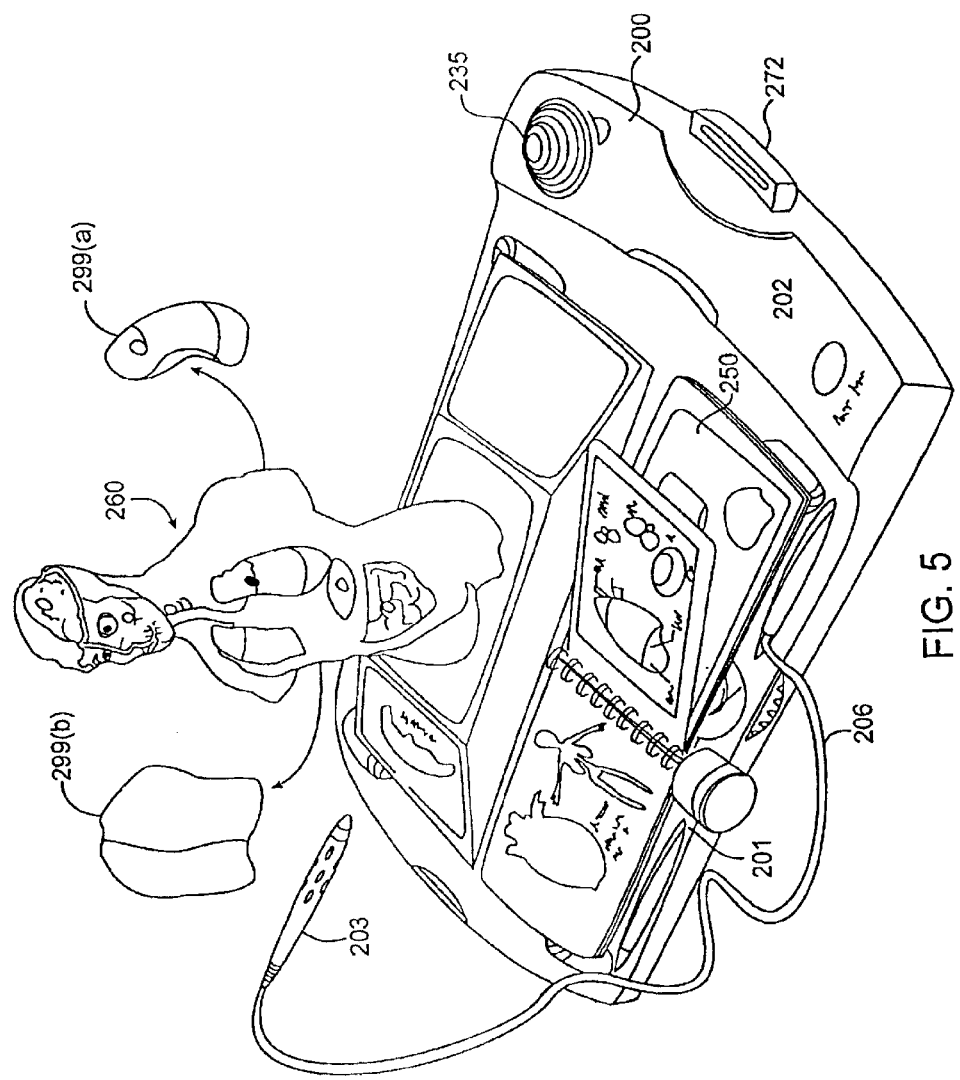
FIG. 5 is a perspective view of a three-dimensional position locating system including a platform unit including a housing, a stylus, a book on the housing, and a three-dimensional structure including a number of detachable parts.

FIG. 5 shows another embodiment of the invention. In this embodiment, the three-dimensional structure 260 is in the form of a figurine with removable parts 299(a), 299(b). These removable parts 299(a), 299(b) could also have antenna coupling elements (not shown) in them. These antenna coupling elements could be, in turn, coupled to antenna coupling elements in other parts of the three-dimensional structure 260 to provide paths to the first antenna element inside of the platform unit 200. In this example, a user can disassemble the parts to see how they fit together or to study the individual parts of the human anatomy. A related book 250 about the human anatomy is on the platform unit. Using the stylus 203, the user may select print elements in the book 250 and/or components of the three-dimensional structure 260 and can receive appropriate audio feedback from the speaker 235.

In this example, a removable cartridge 272 is shown at the side of the platform unit 200. The removable cartridge may contain audio data and electronic map data that correlate particular selectable locations in the book 250 and on the three-dimensional structure 260 with specific outputs.

Figure 6:
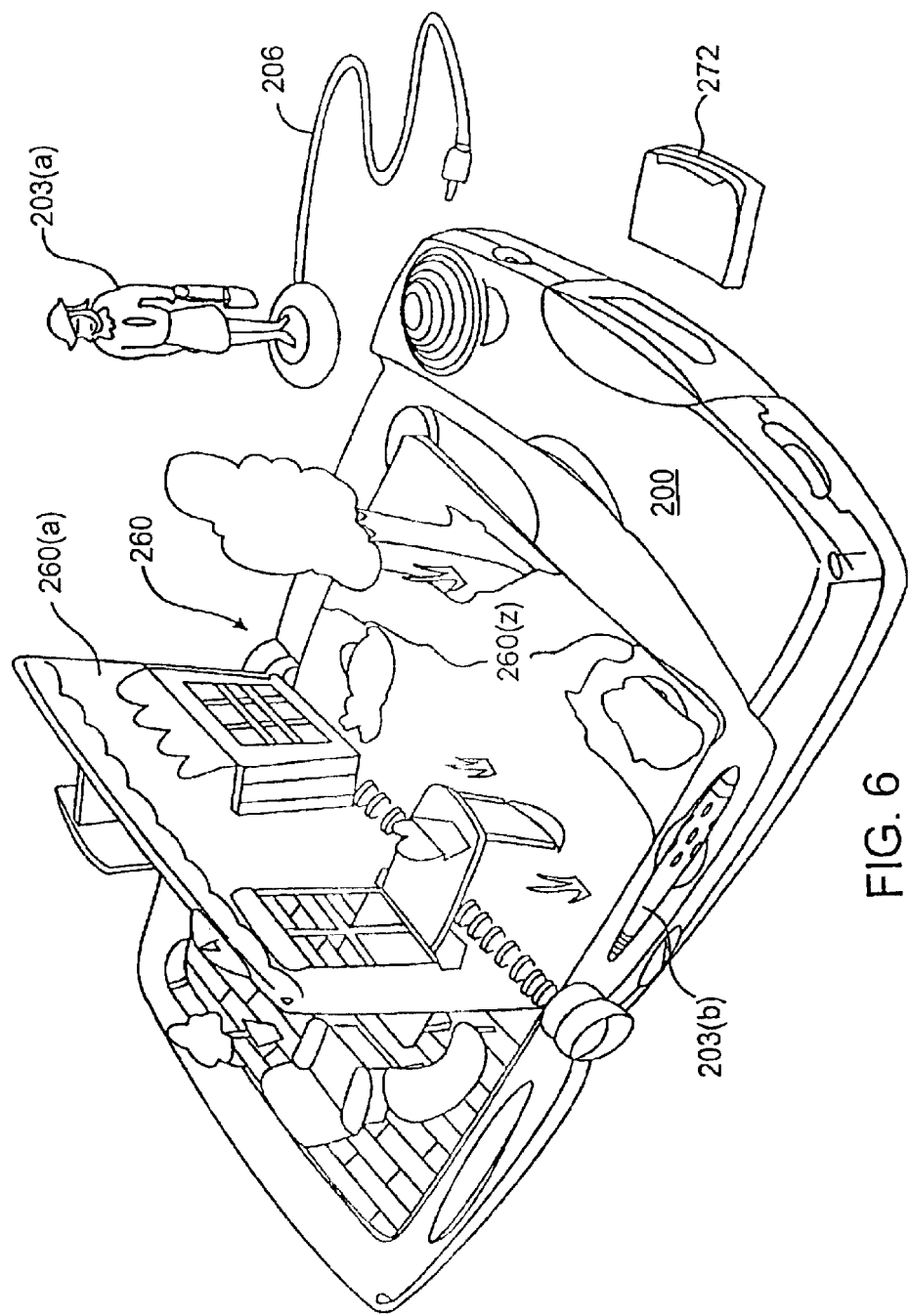
FIG. 6 shows a perspective view of a three-dimensional position locating system including a platform unit including a housing, and a stylus. A three-dimensional structure in the form of a pop-up book is on the housing.

FIG. 6 shows another embodiment of the invention. In this embodiment, the stylus 203(a) and cable 206 are detachable from the platform unit 200. The stylus 203(a) is in the form of a figurine. The end of the cable 206 can have a plug (or other connector) so that it can be electrically coupled to the electronics in the platform unit 200. A separate stylus 203(b) that is not in the form of a figurine can also be provided. In other embodiments, the figurine could be in the form of a slip-on cover that fits over the regular stylus 203(b).

The figurine stylus 203(a) (or other stylus structure) and the three-dimensional structure 260 can relate to a common theme. For example, as shown in FIG. 6, the three-dimensional structure 260 is in the form of a house and the stylus 203 is in the form of a person who might live in the house. Another example might include a stylus in the form of a magnifying glass or a microscope that goes with a book or structure with a theme about science. Yet another example might include a stylus in the form of a cooking utensil (e.g. a spatula) for a book or structure that relates to cooking.

In this embodiment, the three-dimensional structure 260 occupies the entire active surface of the platform unit 200. Unlike the other embodiments, this embodiment shows that a two-dimensional book or other print medium is not necessary in embodiments of the invention. Also, this embodiment illustrates that embodiments of the invention are flexible and can be adapted to the user's needs or desires. For example, the same platform unit 200 can be used in any of the embodiments shown and described with respect to FIG. 2, 3, 4, 5, or 6. The same platform unit 200 could also be used with a two-dimensional book alone, without a three-dimensional structure.

FIGS. 7 and 8 show the platform unit with first and second housing portions 1, 2 in open and closed configurations. A pair of hinges 7 connects the first and second housing portions 1, 2 of the platform. A spring-loaded latch 8 holds the housing portions 1, 2 together when closed. Both the first housing portion 1 and the second housing portion 2 comprise an upper section 9, 10 and a lower section 11, 12. The upper sections 9, 10 of the first and second housings 1, 2 are fixed to their respective lower sections 11, 12 with screws 13.

The upper and lower sections 9, 11 of the first housing portion 1 define a cavity within which is provided a first transmitting antenna element (not shown). The upper and lower sections 10, 12 of the second housing 2 also define a cavity. The second housing portion 2 can house a loudspeaker and processor.

The upper surface of the upper section 9 of the first housing portion 1 has a rectangular recess 20. An identical rectangular recess 22 is provided on the upper surface of the upper section 10 of the second housing portion 2. These rectangular recesses 20, 22 lie adjacent to one another with the long sides of the rectangular recesses being separated by a small gap 23. Together the rectangular recesses 20, 22 provide a surface on which a three-dimensional structure (not shown), and optionally a two-dimensional book having, for example, a spiral binding (not shown) can rest. Transmitting first antenna elements are located immediately beneath these rectangular recesses 20, 22. Provided along the edges of the rectangular recesses 20, 22 remote from the gap 23 are thumb grooves 25, 26. The thumb grooves 25, 26 provide means by which a user is able to access the corners of pages of a book resting on the rectangular recesses 20, 22.

Adjacent to the thumb grooves 25, 26 further along the long sides of the rectangular recesses 20, 22 are a pair of stylus rests 27, 28. These stylus rests 27, 28 are arranged to receive a detection stylus 3. Lying in the stylus rest 28 in the upper section 10 of the second housing portion 2 is a detection stylus 3. The detection stylus 3 is connected via a wire 6 to the processor located within the part of the cavity defined by the second housing 2.

Provided in the upper section 10 of the second housing 2 is a loudspeaker grill 35, which is provided immediately above the loudspeaker, housed within the cavity. This loudspeaker grill 35 is provided at the corner of the upper section 10 of the second housing 2 next to the thumb groove 26.

In the portion of the upper section 10 of the second housing 2 adjacent to the stylus rest 28 there is an ON/OFF button 5. The ON/OFF button 5 is connected to the processor within the second housing portion 2 and provides means for activating the processor and the transmitting first antenna elements within the platform unit.

The second housing portion 2 includes a headphone jack 37 and a slot 38 arranged to receive a cartridge 39. Provided within the slot 38 is a mating interface (not shown in FIGS. 7 and 8) for receiving the cartridge 39. By inserting the cartridge 39 into the slot 38, the cartridge 39 fits into the mating interface. The processor in the second housing portion 2 can access data in the cartridge 39.

Figure 9A:
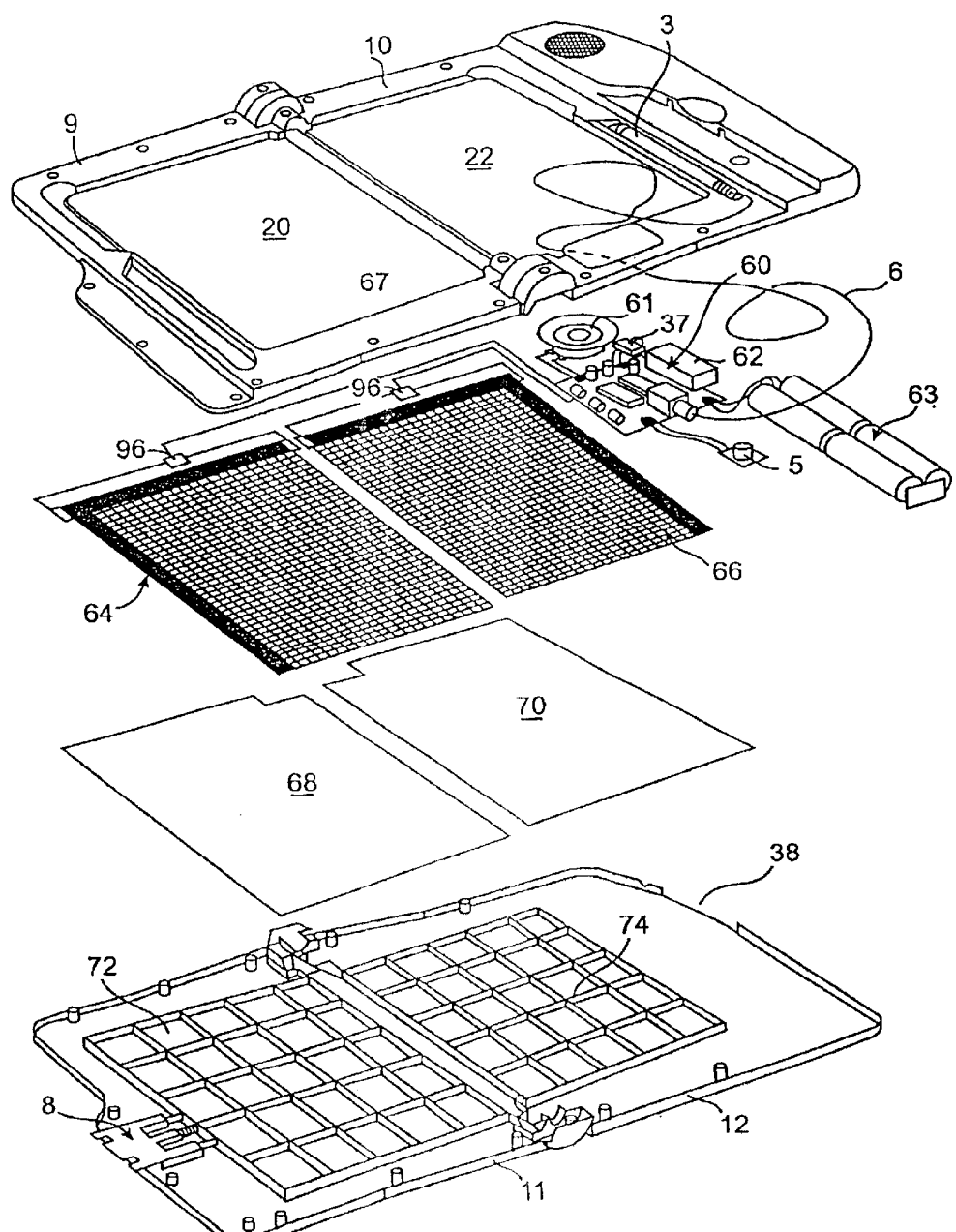
FIG. 9(a) is an exploded view of a platform unit.

FIG. 9(a) is an exploded view of the platform unit. The processor 60 is connected to the loudspeaker 61, the ON/OFF button 5 and the headphone jack 37 and via the wire 6 to the detection stylus 3. Further the processor 60 is connected to a mating interface 62 for receiving a cartridge 39 and a set of batteries 63 for powering the processor 60.

Two first antenna elements 64, 66 are connected via cables 67 to the processor 60 enabling the processor 60 to control the timing of signals generated by the first transmitting antenna elements 64, 66. The first antenna elements 64, 66 are provided directly beneath rectangular recesses 20, 22. They are sandwiched between the underside of the upper sections 9, 10 of the first and second housings 1, 2 defining the rectangular recesses 20, 22 and sheets of cardboard 68, 70. They rest upon supports 72, 74 on the inside surfaces of the lower sections 11, 12 of the first and second housing portions 1, 2.

Figure 9B:
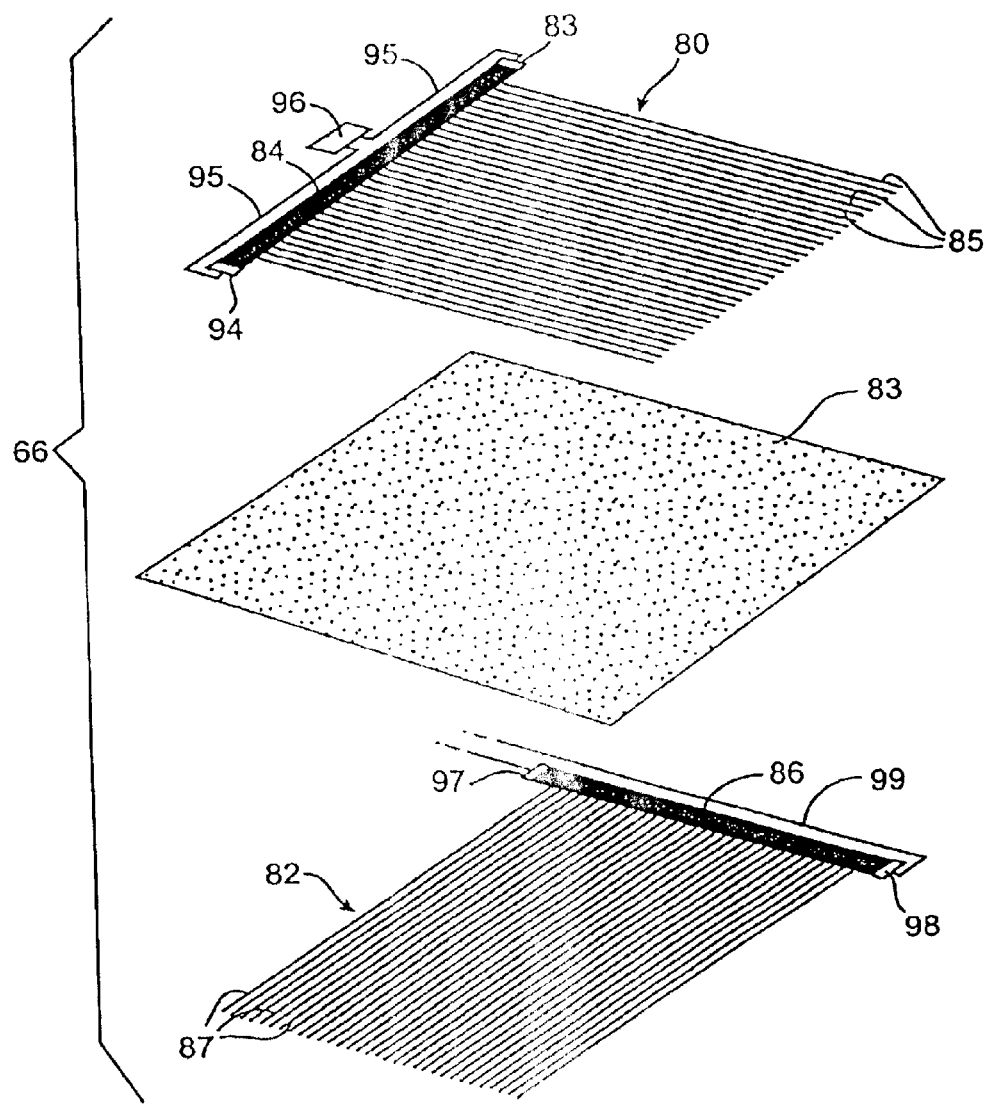
FIG. 9(b) is a schematic exploded perspective view of a first antenna element.

Referring to FIG. 9(b), each first antenna element 64, 66 comprises an upper antenna 80 and a lower antenna 82 separated by an insulating acetate sheet 83. The upper antenna 80 comprises a resistive strip 84 formed by printed conductive ink, that extends along one of the short sides of a rectangle corresponding to the area defined by the rectangular recess 20, 22 beneath which the first antenna element is located. Extending away from the resistive strip 84 at right angles to the resistive strip 84 is a plurality of conductive fingers 85 also comprising printed conductive ink (the conductive fingers could also be formed using photolithography which is well known). These conductive fingers 85 are spaced equidistantly from one another along the length of the resistive strip 84 and run parallel to one another. The conductive fingers 85 extend from the resistive strip to a length corresponding to the extent of the long side of the rectangular recesses 20, 22.

The lower antenna 82 is disposed on the opposite side of the insulating acetate sheet 83 and comprises a second resistive strip 86. This second resistive strip 86 extends along the periphery of the area along the long side defined by the rectangular recesses 20, 22 beneath which the antenna is located. In a similar arrangement to the arrangement of the upper antenna 80, extending away at right angles from the resistive strip 86 of the lower antenna 82 are a plurality of conductive fingers 87 spaced equidistant from one another along the length of the conductive strip 86. The number of conductive fingers 85 of the upper antenna 80, the number of conductive fingers 87 of the lower antenna 82 can vary depending on the desired resolution.

The conductive fingers 85, 87 of the second antenna arrangement 66 within the second housing portion 2 form an orthogonal lattice of equally spaced conductive fingers 85, 87 that extends across the entirety of the area defined by the rectangular recess 22 in the upper section 10 of the second housing portion 2 with conductive strips 84, 86 extending beyond the periphery of this area. Similarly, the conductive fingers 85, 87 of the first antenna element 64 within the first housing portion 1 define an orthogonal lattice of equally spaced conductive fingers 85, 87 extending beneath the extent of the rectangular recess 20 in the upper section 11 of the first housing portion 1. These orthogonal lattices of conductive fingers 85, 87 are used to generate electromagnetic fields in the vicinity of the surface of the recesses 20, 22 which can be detected by the detection stylus 3. They are used to determine which portions of a two-dimensional book or a three-dimensional structure resting within the rectangular recesses 20, 22 has been selected utilizing the detection stylus 3.

Figure 9C:
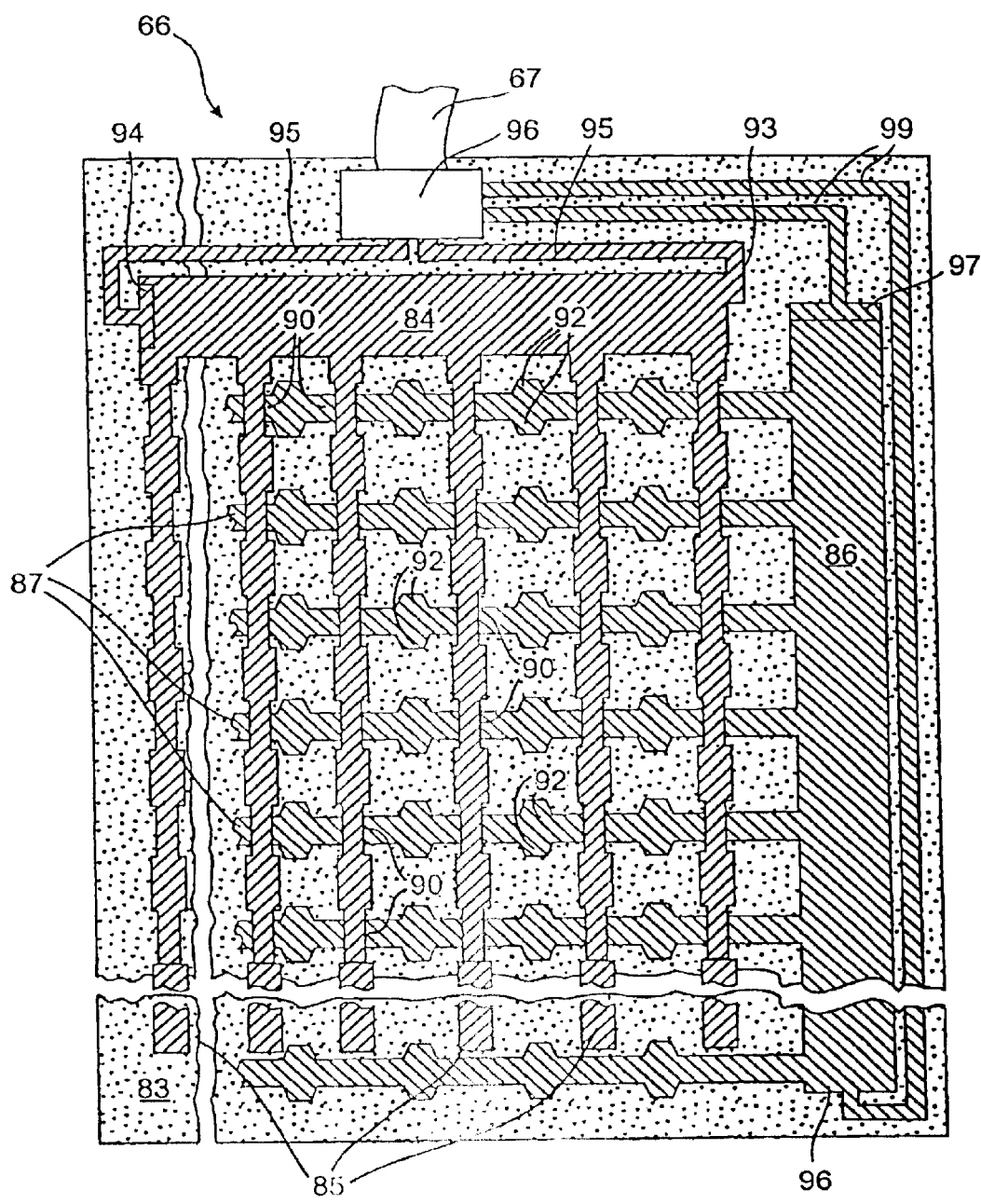
FIG. 9(c) is a partial plan view of a first antenna element.

FIG. 9(c) is a detailed plan view of a first antenna element 66. FIG. 9(c) shows the shape of the conductive fingers 85, 87 of the first antenna element 66. When the conductive fingers 85 extend away from the conductive strip 84 of the upper antenna 80, each of the conductive fingers 85 is identical to one another and comprises a substantially rectangular strip, which has narrower portions 90 wherever the conductive finger 85 overlies one of the conductive fingers 87 of the lower antenna 82. Each conductive finger 87 of the lower antenna 82 includes a rectangular strip with wing portions 92 where the conductive finger 87 is not covered by the conductive fingers 85 of the upper antenna 80.

Provided at either end of the resistive strip 84 of the upper antenna 80 are first 93 and second 94 electrical contacts that are connected via conductive wiring 95 to an interface 96 and hence via the cable 67 to the processor 60. Similar first 97 and second 98 electrical contacts are provided at either end of the resistive strip 86 of the lower antenna 82. These contacts 97, 98 are also connected via conductive wiring 99 to the interface 96, hence via the cable 67 to the processor 60. As in the case of the upper 80 and lower 82 antennas these electrical contacts 93, 94, 97, 98 and the conductive wiring 95, 99 also comprise conductive ink printed on the surface of the acetate sheet 83.

The electrical contacts 93, 94, 97, 98 and conductive wiring 95, 99 enable electrical signals to be applied to the resistive strips 84, 86. When alternating signals are applied to the resistive strips 84, 86 this causes the conductive fingers 85, 87 connected to the resistive strips 84, 85 to generate an alternating electromagnetic field, which can be detected by the detection stylus 3. The resistive strips 84, 86 may comprise a voltage divider strip that allows signals of different voltages to transmit from each of the conductive fingers 85, 87. Further details about the voltage divider strip are in U.S. patent application No. Ser. 09/574,499, filed May 19, 2000. In this U.S. patent application, the voltage divider strip includes a number of resistors in series. These resistors allow the conductive fingers 85, 87 to transmit signals of different voltages. Of course, other types of antenna systems may be used. For example, in other embodiments, it is possible to use a capacitive voltage dividers or capacitively coupled field gradients.

The strength of the generated electromagnetic field depends upon the surface area of the conductive fingers 85, 87 from which the signal is transmitted. Additionally, where the conductive fingers 85 of the upper antenna 80 overlay the conductive fingers 87 of the lower antenna 82, the conductive fingers 85, of the upper antenna 80 block the generation of a field by portions of the conductive fingers 87 of the lower antenna 82.

In order to compensate for this reduction in field strength the narrower portions 90 are provided within the conductive fingers 85 of the upper antenna to minimize the portion of the conductive fingers 87 of the lower antenna that are blocked from transmitting. Furthermore, in order to increase the strength of fields generated by the lower antenna 82, the additional wing portions 92 are included on the portions of the conducting fingers 87 of the lower antenna that are not blocked by the conductive fingers 85 of the upper antenna 80. Together the narrower portions 90 in the conductive fingers 85 of the upper antenna and the wing portions 92 provided on the conductive fingers 87 of the lower antenna 82 enable electromagnetic fields of approximately the same strength to be generated by both the upper and lower antennas 80, 82.

Figure 10:
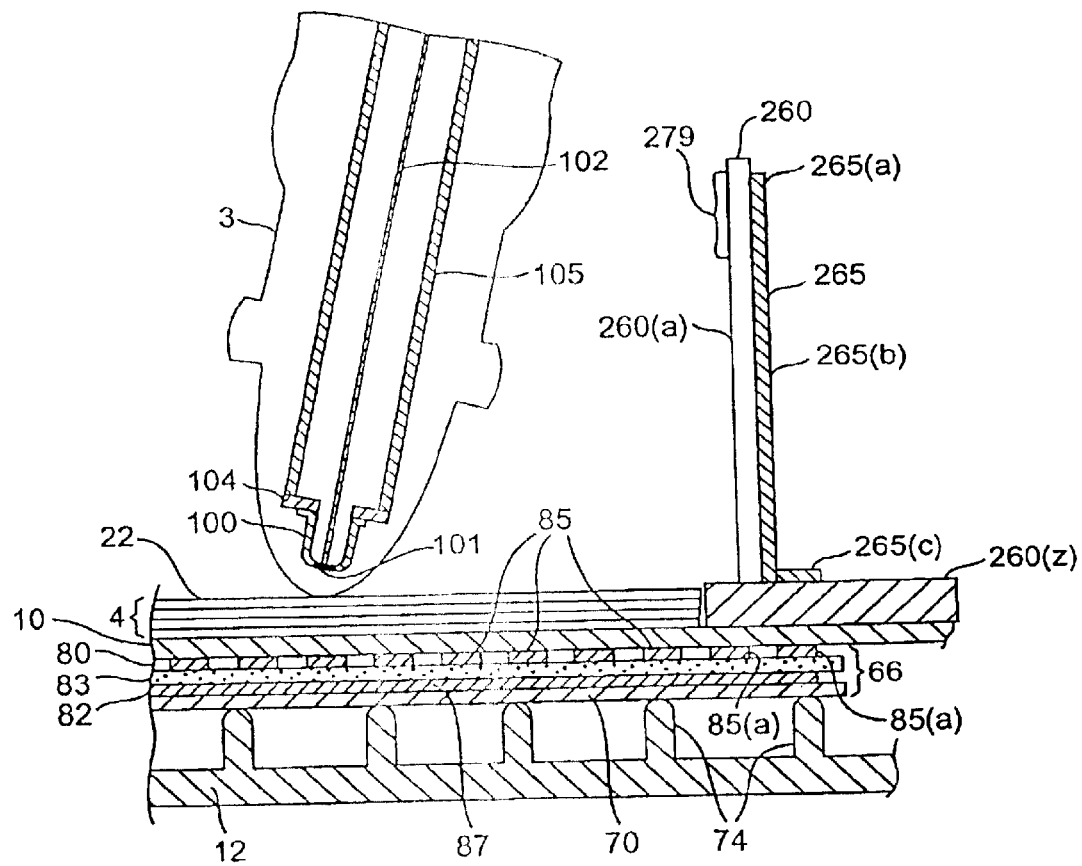
FIG. 10 is a schematic partial cross-section of a portion of the system while it is in use.

FIG. 10 is a schematic cross section of the detection stylus 3 in use detecting an electrostatic field generated by the first antenna element 66. The detection stylus 3 is shown resting on the surface of the page of a book 4 that lies within the recess 22 in the upper section 10 of the second housing 2. Immediately beneath the upper section 10 of the second housing 2 lie the conducting fingers 85 of the upper antenna 80 of the first antenna element 66. These conductive fingers 85 are provided above the acetate insulating sheet 83 that separates the upper antenna 80 from the lower antenna 82. Disposed on the opposite side of the acetate sheet 83 are the conductive fingers 87 of the lower antenna 82. Beneath the lower antenna 82 lies the protective sheet of card 70 that it supported by the supports 74 of the lower section 12 of the second housing 2.

The distal end of the detection stylus 3 includes a brass ferule 100 that is connected via a solder bead 101 to a copper wire 102, which is connected via wire 6 to the processor 60. Provided at the end of the brass ferule 100 remote from the solder bead 101 is an insulating washer 104. The copper wire 102 extends through the center of this insulating washer 104. Shielding 105 extends within the detection stylus 3, the extent of the copper wire 102 to the insulating washer 104.

Referring to FIGS. 9(a)–9(c) and 10, alternating electric signals are applied via the electrical contacts 93, 94, 97, 98 to the resistive strips 84, 86 of the upper and lower antennas 80, 82. This causes an alternating electromagnetic field to be generated in the vicinity of the antennas 80, 82. This alternating electromagnetic field induces a voltage on the brass ferule 100 of the detection stylus 3 when the detection stylus 3 rests on the surface of a book 4 within the recess 22 adjacent to the antennas 80, 82. This electric signal is then passed via the wire 102 to the processor 60. The insulating washer 104 and shielding 105 prevent electrical signals from being induced within the wire 102 other than by variations in the electromagnetic field in the vicinity of the brass ferrule 100.

A three-dimensional structure 260 including a base 265(z) and a vertical portion 260(a) is on the upper section 10 and is over the conductive fingers 85(a). An antenna coupling element 265 is on the three-dimensional structure 260 and includes a distal portion 265(a), an intermediate portion 265(b), and a proximate portion 265(c). The distal portion 265(a) and a print element 279 (e.g., a picture) adjacent to it may correspond to a "hot spot" that can be selected by a user using the stylus 3. The base 265(z) and the upper portion of the housing may be non-conductive. When the tip of the stylus 3 is placed adjacent to the print element 279, it receives a unique signal that is transmitted from the conductive fingers 85(a) and through the antenna coupling element 265.

Figure 11:
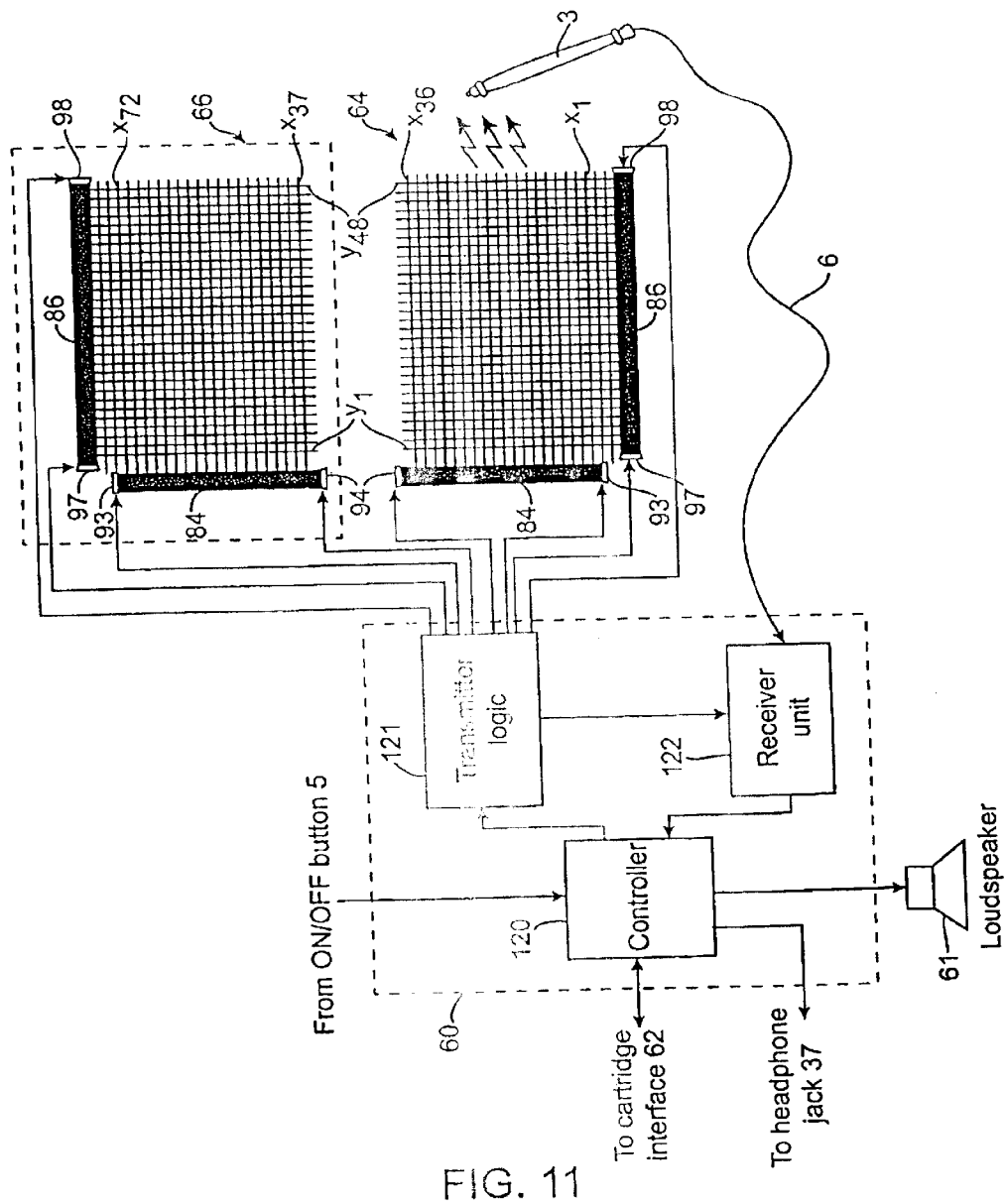
FIG. 11 shows a schematic block diagram of some components of a system according to an embodiment of the invention.

FIG. 11 is a schematic block diagram of the processor 60 and the first antenna elements 64, 66. The processor 60 comprises a controller unit 120, transmitter logic 121 and a receiver unit 122. The processor 60 may include a signal driver and a signal processor. The controller unit 120 is connected via the transmitter logic 121 to the first antenna elements 64, 66. The controller unit 120 is also connected via the receiver unit 122 via the wire 6 to the detection stylus 3. The transmitter logic 121 and receiver unit 122 are also connected to each other directly. The controller unit 120 is also connected to the headphone jack 37, the loudspeaker 61, the cartridge mating interface 62 and the ON/OFF button 5.

When the ON/OFF button 5 is pressed, this is detected by the controller unit 120 which causes the transmitter logic 121 to be activated. The transmitter logic 121 then applies electric signals to the electrical contacts 93, 94, 97, 98 of the first antenna elements 64, 66 in a sequence of frames. Referring to FIG. 9(c), in these frames, each lasting approximately 3 milliseconds, predetermined electrical signals are applied to the contacts 93, 94, 97, 98 of the transmitting antenna arrangements 62, 64. At the end of each frame a different set of signals are then applied to the contacts 93, 94, 97, 98.

In the course of a frame, an electromagnetic field is generated in the vicinity of the rectangular recesses 20, 22 in the upper sections 9, 10 in the first and second housing portions 1, 2. These electromagnetic fields induce voltage potentials in the brass ferule 100 of detection stylus 3. This signal is then passed via the wire 6 to the receiver unit 122. In one example, the voltages applied to the contacts 93, 94, 97, 98 may range between plus three volts and minus three volts. The voltage induced within the brass ferule 100 can be about 0.5 millivolts. The receiver unit 122 then processes the induced voltage and a processed signal is then passed to the controller unit 120.

The controller unit 120 then converts the processed signals received from the receiver unit 122 into signals identifying the coordinates of the portion of the page of the book 4 at which the detection stylus 3 is currently located or the coordinates corresponding to the antenna coupling element 265. These coordinates are then used to select an appropriate sound stored within a sound memory either provided as part of the controller unit 120 or alternatively a sound memory provided as a memory chip within a cartridge 39 inserted within the cartridge interface 62. The appropriate sound is then output via the loudspeaker 61 or to a set of headphones via the headphone jack 37.

Figure 12:
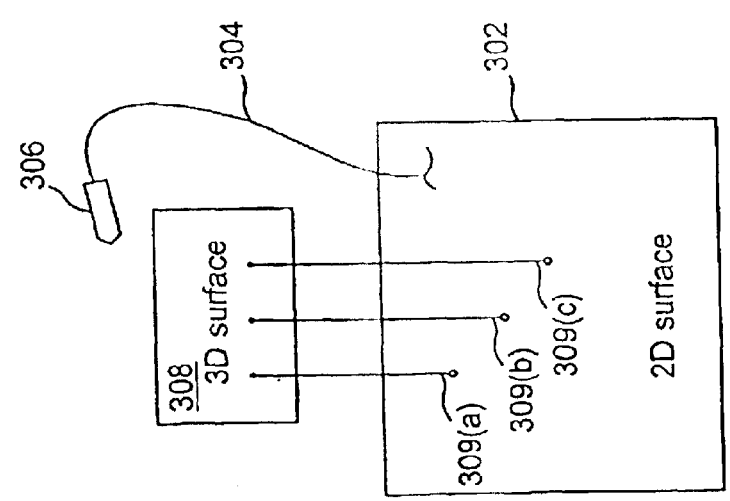
FIG. 12 shows a schematic of vertically oriented antenna coupling elements located over an underlying two-dimensional antenna element.

The antenna coupling elements used in embodiments of the invention may be shielded or unshielded. A schematic diagram of an unshielded embodiment is shown in FIG. 12. FIG. 12 shows a two-dimensional surface 302 with unshielded vertical antenna coupling elements 309(a)–309(c) over the surface 302. Ends of the coupling elements 309(a)–309(c) are proximate a three-dimensional surface 308 of a three-dimensional structure. A stylus 306 is coupled to the electronics under the surface 302 via a cable 304.

Figure 14:
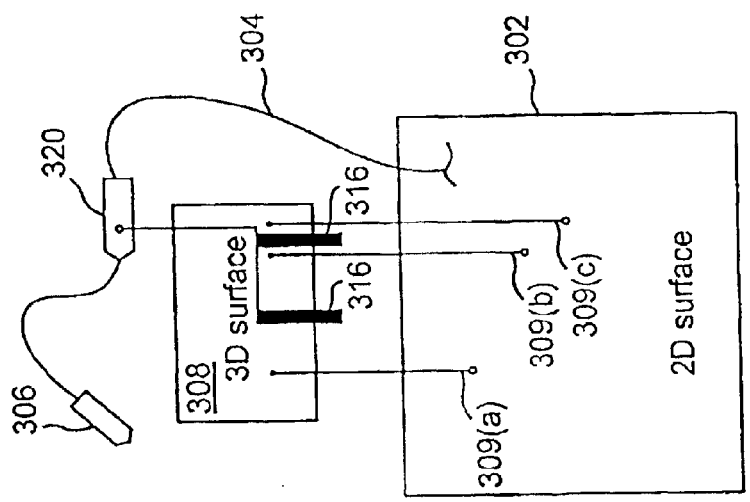
FIG. 14 shows another shielding embodiment, in which the antenna coupling elements that are unshielded along their length are separated near their terminal ends by an electric field shield positioned in the 3-D volume near the active surface. The shield may be grounded through the stylus or through the headphone jack.
Figure 13:
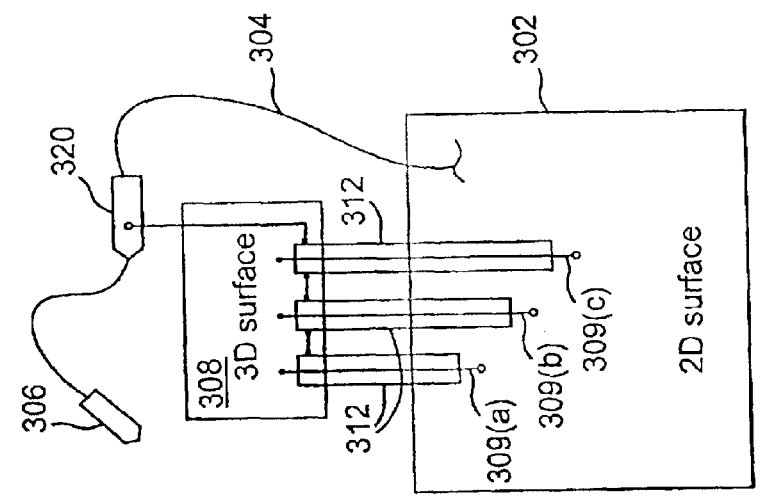
FIG. 13 shows a schematic of vertically oriented antenna coupling elements located over an underlying two-dimensional antenna element, wherein the vertical antenna coupling elements are shielded and grounded through an electrically neutral point in the stylus or through a ground in a headphone jack.

Because the antenna coupling elements radiate signals, resolution in the vertical direction will improve if the antenna coupling elements are shielded. There are many ways in which the antenna coupling elements can be shielded. In one embodiment, conductive sheaths can be placed around each antenna coupling element, leaving only the tip exposed and radiating (or receiving, as the case may be). A schematic of this embodiment is shown in FIG. 13. In FIG. 13, the elements are substantially the same as in FIG. 12, except that conductive sheaths 312 cover the antenna coupling elements 309(a)–309(c) and are grounded to a stylus adaptor 320. In another embodiment, a conducting shield can be placed between neighboring antenna coupling elements in the three-dimensional structure. A schematic of this embodiment is in FIG. 14. In FIG. 14, the elements are substantially the same, except that shield structures 316 are interposed between the antenna coupling elements 309(a)–309(c). The shield structures 316 are coupled to a stylus adaptor 320. There are many other shielding configurations that can be used and they are of general knowledge to those skilled in the electronic arts.

If the stylus used for the planar position locating system has a ground, the shielding can be grounded through the stylus ground. One way to ground the shielding for the vertical antenna coupling elements to the stylus ground is by using a secondary stylus adaptor (illustrated in FIGS. 13 and 14). In this embodiment, the grounded stylus of the two-dimensional position locating system can be connected to an adaptor sleeve having a connection to the shielding in the three-dimensional structure. The ground in the two-dimensional position locating system is thus connected through the stylus adaptor to the shielding in the three-dimensional structure. Alternatively, if the device has a headphone jack, the shielding can be grounded to the ground in the headphone jack. Yet another alternative comprises grounding the shielding in the three-dimensional structure through a stylus configured specifically for the three-dimensional structure to any other ground in the two-dimensional position locating system.

The vertical antenna coupling elements described above are essentially passive. They can be conducting traces that pick up and re-radiate a signal from the transmitting antenna. Embodiments of the invention also comprise a system in which a position of a stylus or pointer is located on a three-dimensional structure by use of an "active" antenna in the third, or vertical dimension. As used in this document, an "active" antenna means one that is directly activated by a signal generator or processor.

Figure 15:
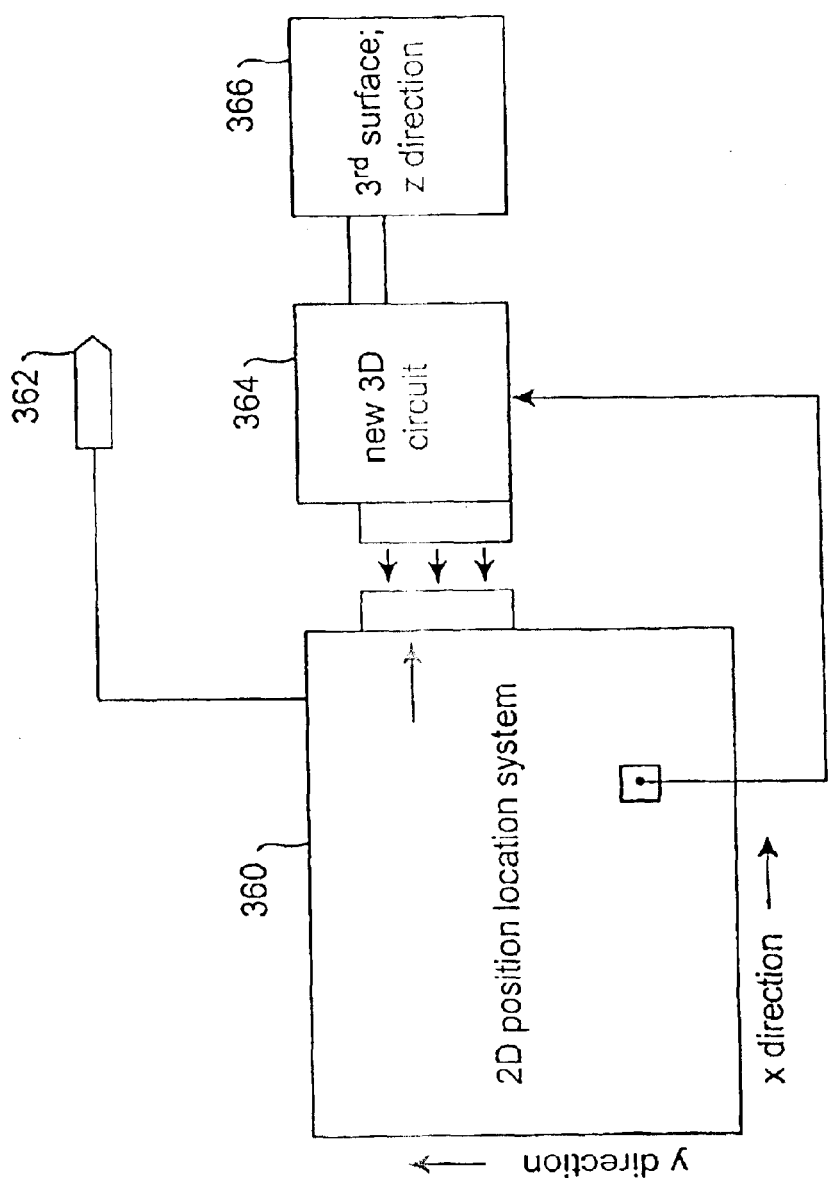
FIG. 15 shows a schematic for a separately driven position location system for the third, vertical dimension. The second antenna system is driven by a synchronized reference to the underlying antenna element of the two dimensional position locating system.

FIG. 15 shows a schematic of an active second antenna system used to locate a stylus in the third dimension. The apparatus in this embodiment comprises a transmitting antenna element 360, configured with a network of antenna fingers as described in application Ser. No. 09/574,499. A book can be placed on the platform, and when a stylus 362 that contains a receiving antenna is placed over the book, a signal processor calculates the stylus position over the transmitting antenna. A cartridge 364 containing coded information can be connected to the processor so that the location of the stylus can be correlated to the images in the book and an audio generating device can be activated to generate an audio signal through a speaker. The audio signal can be as programmed into the system as appropriate.

The cartridge 364 contains the coding appropriate to a book, document, or other overlay to be placed on a platform containing the underlying 2-D transmitting antenna 360. The overlay may contain a three-dimensional structure 366 having a transmitting antenna system attached to it ("the 3D antenna element") and the cartridge 364 may contain data necessary to activate the 3D antenna element. The cartridge 364 could contain code to synchronize transmissions from the 3D antenna element with the activation of the 2D antenna system 360. The stylus 362, having a receiving antenna, would interpret signals from both the 2D and the 3D antenna systems synchronously. The 3D antenna element could be driven by many mechanisms, including for example: (a) coupling to the underlying 2D antenna element to capture synchronized signals; (b) via a cable and electrical circuit attached to the cartridge; or (c) signals generated directly from a processor that drives the 2D position locating system.

The embodiments of the invention that are described above have a number of advantages. For example, by using three-dimensional structures, a user can perceive, evaluate, study, or imagine a particular object better than if only two-dimensional structures are used. Consequently, the user can better comprehend the particular subject being taught. Additionally, by using three-dimensional structures, the interactive system as a whole is more inviting to a user than conventional systems using only two-dimensional books. The three-dimensional structures are interactive in embodiments of the invention and can make learning fun and interesting for the user. Also, in embodiments of the invention, the platform unit can be used with a book alone, with a three-dimensional structure alone, or with a book and a three-dimensional structure. Embodiments of the invention can be changed to suit the needs or desires of the user.

Those skilled in the art will appreciate that various adaptations and modifications of the above-described embodiments can be configured without departing from the scope and spirit of the inventions. Therefore, it is to be understood that, within the scope of the appended claims, the invention may be practiced other than as specifically described herein.

Moreover one or more features of embodiments of the invention may be combined with any other feature without departing from the scope and spirit of the invention. For example, although a detachable stylus in the form of a figurine is shown in FIG. 5, and not in other specifically described embodiments, it is understood that any embodiment of the invention may include a stylus in the form of a figurine.

What is claimed is:

1. A three-dimensional position locating system comprising:
   (a) an essentially two-dimensional antenna element underlying an essentially planar surface;
   (b) an antenna element located in a stylus, coupled to the underlying antenna element through a signal driver and signal processor;
   (c) a three-dimensional structure overlying the underlying antenna element;
   (d) at least one antenna coupling element having a first end proximal to the underlying antenna element and having a second end near a surface of the three-dimensional structure; and
   (e) an audio generating circuit coupled to the signal processor and responsive to the position located using the stylus.

2. The three-dimensional position locating system of claim 1 wherein the three-dimensional structure occupies a first portion of the essentially planar surface and wherein the three-dimensional position locating system also includes a print medium, wherein the print medium occupies a second portion of the essentially planar surface.

3. The three-dimensional position locating system of claim 1 wherein the at least one antenna coupling element is within the three-dimensional structure.

4. A three-dimensional position locating system comprising:
   (a) a housing including a substantially planar surface, wherein the housing houses a first antenna element, the first antenna element being under the substantially planar surface;
   (b) a stylus comprising a second antenna element;
   (c) a processor electrically coupled to the first antenna element and the second antenna element;
   (d) a three-dimensional structure overlying the substantially planar surface and the first antenna element;
   (e) an antenna coupling element associated with the three-dimensional structure; and
   (g) an output device coupled to the processor.

5. The three-dimensional position locating system of claim 4 wherein the housing includes two housing portions coupled together through at least one hinge.

6. The three-dimensional position locating system of claim 4 wherein the stylus includes a distal end and a conductive gripping region that grounds a user gripping the stylus.

7. The three-dimensional position locating system of claim 4 wherein the processor comprises a receiver unit and a transmitter.

8. The three-dimensional position locating system of claim 4 wherein the output device is a speaker, and wherein the speaker and the processor are in the housing.

9. The three-dimensional position locating system of claim 4 wherein the housing includes a slot for receiving a transferable information storage medium.

10. The three-dimensional position locating system of claim 4 wherein the three-dimensional structure is configured to occupy a first portion of the substantially planar surface and wherein the system also includes a print medium, wherein the print medium is configured to occupy a second portion of the substantially planar surface.

11. The three-dimensional position locating system of claim 10 wherein the print medium is a book.

12. The three-dimensional position locating system of claim 10 wherein the print medium is a book with a spiral spine or a ring binder.

13. The three-dimensional position locating system of claim 4 wherein the three-dimensional structure comprises a sculpture.

14. The three-dimensional position locating system of claim 4 wherein the three-dimensional structure comprises a pop-up structure.

15. The three-dimensional position locating system of claim 4 wherein the three-dimensional structure comprises a paper or cardboard structure.

16. The three-dimensional position locating system of claim 4 wherein the three-dimensional structure comprises a plurality of distinct substructures.

17. The three-dimensional position locating system of claim 4 wherein the first antenna element comprises a plurality of conductive fingers.

18. The three-dimensional position locating system of claim 4 wherein the housing is in the form of a unitary body.

19. The three-dimensional position locating system of claim 4 wherein the housing houses the processor and the output device, wherein the output device includes a speaker, and wherein the housing is coupled to the stylus via a cable.

20. The three-dimensional position locating system of claim 4 wherein the three-dimensional structure comprises paper or cardboard, and wherein the antenna coupling element includes a conductive trace that is on the paper or cardboard.

21. The three-dimensional position locating system of claim 4 wherein the three-dimensional structure is configured to occupy a first portion of the substantially planar surface, wherein the three-dimensional position locating system also includes a print medium, the print medium adapted to occupy a second portion of the substantially planar surface, and wherein content in the print medium and the three-dimensional structure correspond to a common theme.

22. The three-dimensional position locating system of claim 4 wherein the surface is defined by a recessed region in the housing.

23. The three-dimensional position locating system of claim 4 wherein the housing separates the antenna coupling element and the first antenna element.

24. The three-dimensional position locating system of claim 4 wherein the three-dimensional structure comprises a plurality of distinct substructures, each substructure being associated with at least one antenna coupling element.

25. The three-dimensional position locating system of claim 24 wherein each antenna coupling element includes a first end, a second end, and an intermediate portion, wherein the first and second ends are wider than the intermediate portion.

26. A three-dimensional position locating system comprising:
  (a) a housing including a substantially planar surface, wherein the housing houses a first antenna element, which is under the substantially planar surface;
  (b) a stylus comprising a second antenna element;
  (c) a processor electrically coupled to the first antenna element and the second antenna element;
  (d) a three-dimensional structure overlying the first antenna element and the substantially planar surface; and
  (e) an output device coupled to the processor.

27. The three-dimensional position locating system of claim 26 further comprising an antenna coupling element within or on the three-dimensional structure.

28. The three-dimensional position locating system of claim 26 wherein the three-dimensional structure is a sculpture.

29. The three-dimensional position locating system of claim 26 wherein the first antenna element comprises a transmitting antenna.

30. The three-dimensional position locating system of claim 26 wherein the three-dimensional structure is a book with a pop-up structure.

31. The three-dimensional position locating system of claim 26 wherein the three-dimensional structure occupies a first portion of the surface and wherein the system further comprises a two-dimensional book that occupies a second portion of the surface.

32. The three-dimensional position locating system of claim 26 wherein the three-dimensional structure comprises a plurality of figurines.

33. The three-dimensional position locating system of claim 26 further comprising an antenna coupling element associated with the three-dimensional structure and a shielding element associated with the antenna coupling element, wherein the shielding element is grounded.

34. A three-dimensional position locating system comprising:
  (a) a housing including a surface, wherein the housing houses a first antenna element, which is under the surface;
  (b) a stylus comprising a second antenna element;
  (c) a processor electrically coupled to the first antenna element and the second antenna element;
  (d) a structure having at least a portion that is generally vertical oriented with respect to the substantially planar surface and overlying the first antenna element and the surface;
  (e) an antenna coupling element associated with the structure; and
  (f) an output device coupled to the processor.

35. The three-dimensional position locating system of claim 34 wherein structure is a sculpture.

36. The three-dimensional position locating system of claim 34 further comprising an antenna coupling element associated with the structure.

37. The three-dimensional position locating system of claim 34 wherein the housing includes two housing portions coupled together with at least one hinge.

38. The three-dimensional position locating system of claim 34 wherein the surface is planar.

39. A three-dimensional toy for use with a platform unit having a housing that houses a first antenna element and a stylus that includes a second antenna element, the three-dimensional toy comprising:
  (a) a three-dimensional structure; and
  (b) an antenna coupling element associated with the three-dimensional structure,
  wherein the antenna coupling element is adapted to electromagnetically couple the first and second antenna elements when the three-dimensional toy is used with the platform unit.

40. The three-dimensional position locating system of claim 34 wherein the antenna coupling element includes a proximate portion, a distal portion, and an intermediate portion, the proximate and distal portions being wider than the intermediate portion.

41. The three-dimensional position locating system of claim 34 wherein the three-dimensional structure includes a mechanical switch.

42. A kit comprising:
  the toy of claim 34; and
  a book, wherein the toy and the book correspond to a common theme or subject.

43. The kit of claim 42 further comprising:
  a transferable information storage medium comprising output data for the toy and for the book.

* * * * *